(12) United States Patent
Tsukagoshi

(10) Patent No.: US 11,627,367 B2
(45) Date of Patent: *Apr. 11, 2023

(54) TRANSMITTING DEVICE, TRANSMITTING METHOD, RECEIVING DEVICE, AND RECEIVING METHOD

(71) Applicant: SONY CORPORATION, Tokyo (JP)

(72) Inventor: Ikuo Tsukagoshi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/030,308

(22) Filed: Sep. 23, 2020

(65) Prior Publication Data

US 2021/0051362 A1 Feb. 18, 2021

Related U.S. Application Data

(63) Continuation of application No. 15/543,428, filed as application No. PCT/JP2016/053923 on Feb. 10, 2016, now Pat. No. 10,791,364.

(30) Foreign Application Priority Data

Feb. 27, 2015 (JP) .............................. JP2015-039234

(51) Int. Cl.
*H04N 7/18* (2006.01)
*H04N 21/435* (2011.01)
(Continued)

(52) U.S. Cl.
CPC ......... *H04N 21/4356* (2013.01); *H04N 19/30* (2014.11); *H04N 19/70* (2014.11);
(Continued)

(58) Field of Classification Search
CPC .... H04N 21/4356; H04N 19/30; H04N 19/70; H04N 21/235; H04N 21/2365;
(Continued)

(56) References Cited

U.S. PATENT DOCUMENTS 5,515,106 A * 5/1996 Chaney .............. H04N 21/4345
348/E5.005
8,305,456 B1 11/2012 McMahon
(Continued)

FOREIGN PATENT DOCUMENTS

CN 102388539 A 3/2012
EP 2 400 748 A2 12/2011
(Continued)

OTHER PUBLICATIONS

Extended European Search Report dated June 11, 2018 in corresponding European Patent Application No. 167552173 citing documents AP and A0 therein, 7 pages.
(Continued)

*Primary Examiner* — Annan Q Shang
(74) *Attorney, Agent, or Firm* — Oblon, McClelland, Maier & Neustadt, L.L.P.

(57) ABSTRACT

The present invention enables a receiving side to easily recognize a high-quality format corresponding to encoded image data included in an extended video stream. Two video streams including a basic video stream including encoded image data of basic format image data, and an extended video stream including encoded image data of high-quality format image data of one type selected from a plurality of types are generated. A container of a predetermined format including the basic video stream and the extended video stream is transmitted. Information indicating a high-quality format corresponding to the encoded image data included in the extended video stream is inserted into the extended video stream and/or the container.

20 Claims, 22 Drawing Sheets

(51) Int. Cl.
*H04N 19/70* (2014.01)
*H04N 19/30* (2014.01)
*H04N 21/2365* (2011.01)
*H04N 21/235* (2011.01)

(52) U.S. Cl.
CPC ....... *H04N 21/235* (2013.01); *H04N 21/2365* (2013.01); *H04N 21/435* (2013.01)

(58) Field of Classification Search
CPC ...... H04N 21/435; H04N 19/50; H04N 19/98; H04N 21/2343; H04N 21/23605; H04N 21/23608; H04N 21/4343; H04N 21/4347; H04N 21/2362; H04N 21/234327; H04N 21/4345; H04N 21/8451
See application file for complete search history.

(56) References Cited

U.S. PATENT DOCUMENTS

| | | | |
|---|---|---|---|
| 8,305,546 | B2 | 11/2012 | Jeon |
| 8,561,102 | B1 | 10/2013 | Mack |
| 8,752,085 | B1 | 6/2014 | Brueck |
| 2007/0223813 | A1 | 9/2007 | Segall et al. |
| 2008/0181298 | A1* | 7/2008 | Shi .................. H04N 21/435 375/E7.125 |
| 2010/0023963 | A1 | 1/2010 | Crookes |
| 2010/0299703 | A1 | 11/2010 | Altman |
| 2011/0011939 | A1 | 1/2011 | Seah |
| 2011/0022471 | A1 | 1/2011 | Brueck |
| 2011/0119396 | A1 | 5/2011 | Kwon et al. |
| 2013/0007814 | A1 | 1/2013 | Cherian |
| 2013/0010384 | A1 | 1/2013 | Nonaka et al. |
| 2013/0103849 | A1 | 4/2013 | Mao et al. |
| 2013/0268961 | A1 | 10/2013 | Miles |
| 2013/0279576 | A1* | 10/2013 | Chen .................. H04N 19/70 375/240.12 |
| 2013/0282915 | A1 | 10/2013 | Patel |
| 2014/0013349 | A1 | 1/2014 | Miliar |
| 2014/0029675 | A1 | 1/2014 | Su |
| 2014/0092991 | A1* | 4/2014 | Sullivan ............... H04N 19/134 375/240.26 |
| 2014/0344470 | A1 | 11/2014 | Lee et al. |
| 2015/0003749 | A1* | 1/2015 | Kim .................. H04N 19/30 382/232 |
| 2015/0042890 | A1 | 2/2015 | Messmer |
| 2015/0245044 | A1 | 8/2015 | Guo |
| 2015/0258681 | A1 | 9/2015 | Kinoshita |
| 2015/0281746 | A1 | 10/2015 | Lam |
| 2015/0281752 | A1 | 10/2015 | Van Veldhuisen |
| 2016/0042227 | A1 | 2/2016 | Zhong |
| 2016/0044277 | A1 | 2/2016 | Oh |
| 2016/0050468 | A1 | 2/2016 | Morten |
| 2016/0073118 | A1 | 3/2016 | Iguchi |
| 2016/0088322 | A1 | 3/2016 | Horev |
| 2016/0119657 | A1 | 4/2016 | Sun |
| 2016/0142762 | A1 | 5/2016 | Tsukagoshi |
| 2016/0182923 | A1 | 6/2016 | Higgs |
| 2016/0205371 | A1 | 7/2016 | Wallace |
| 2016/0234472 | A1 | 8/2016 | Mertens |
| 2016/0248939 | A1 | 8/2016 | Thurston, III |
| 2016/0337487 | A1 | 11/2016 | Kwon |
| 2017/0034497 | A1 | 2/2017 | Yahata |
| 2017/0105042 | A1 | 4/2017 | Toma |
| 2017/0311034 | A1 | 10/2017 | Nishi |
| 2017/0330529 | A1 | 11/2017 | Van Mourik |
| 2017/0374313 | A1 | 12/2017 | Oh |
| 2018/0007363 | A1 | 1/2018 | Oh |
| 2018/0152499 | A1 | 5/2018 | Oyman |
| 2021/0185390 | A1* | 6/2021 | Nishi ...................... G09G 5/14 |

FOREIGN PATENT DOCUMENTS

| | | |
|---|---|---|
| JP | 2007-257641 A | 10/2007 |
| JP | 2008-543142 A | 11/2008 |
| JP | 2012054800 A | 3/2012 |
| JP | 2013-511201 A | 3/2013 |
| JP | 2015-5976 A | 1/2015 |
| JP | 2015-501090 A | 1/2015 |
| JP | 2015-503281 A | 1/2015 |
| JP | 2015005977 A | 1/2015 |
| JP | 2015080203 A | 4/2015 |
| KR | 20080112074 A | 12/2008 |
| KR | 20110053179 A | 5/2011 |
| WO | WO 2008/156325 A2 | 12/2008 |

OTHER PUBLICATIONS

International Search Report dated Mar. 8, 2016 in PCT/JP2016/053923 filed Feb. 10, 2016.

* cited by examiner

NAL unit header syntax

| Syntax | No. of Bits | Format |
|---|---|---|
| nal_unit_header() { | | |
| forbidden_zero_bit | 1 | bslbf |
| nal_unit_type | 6 | uimsbf |
| nuh_layer_id | 6 | bslbf |
| nuh_temporal_id_plus1 | 3 | uimsbf |
| } | | |

*FIG. 6A*

Semantics

| | | |
|---|---|---|
| nuh_layer_id | (6bits) | INDICATING id OF EXTENDED LAYER |
| nuh_temporal_id_plus1 | (3bits) | INDICATING temporal_id VALUE |

*FIG. 6B*

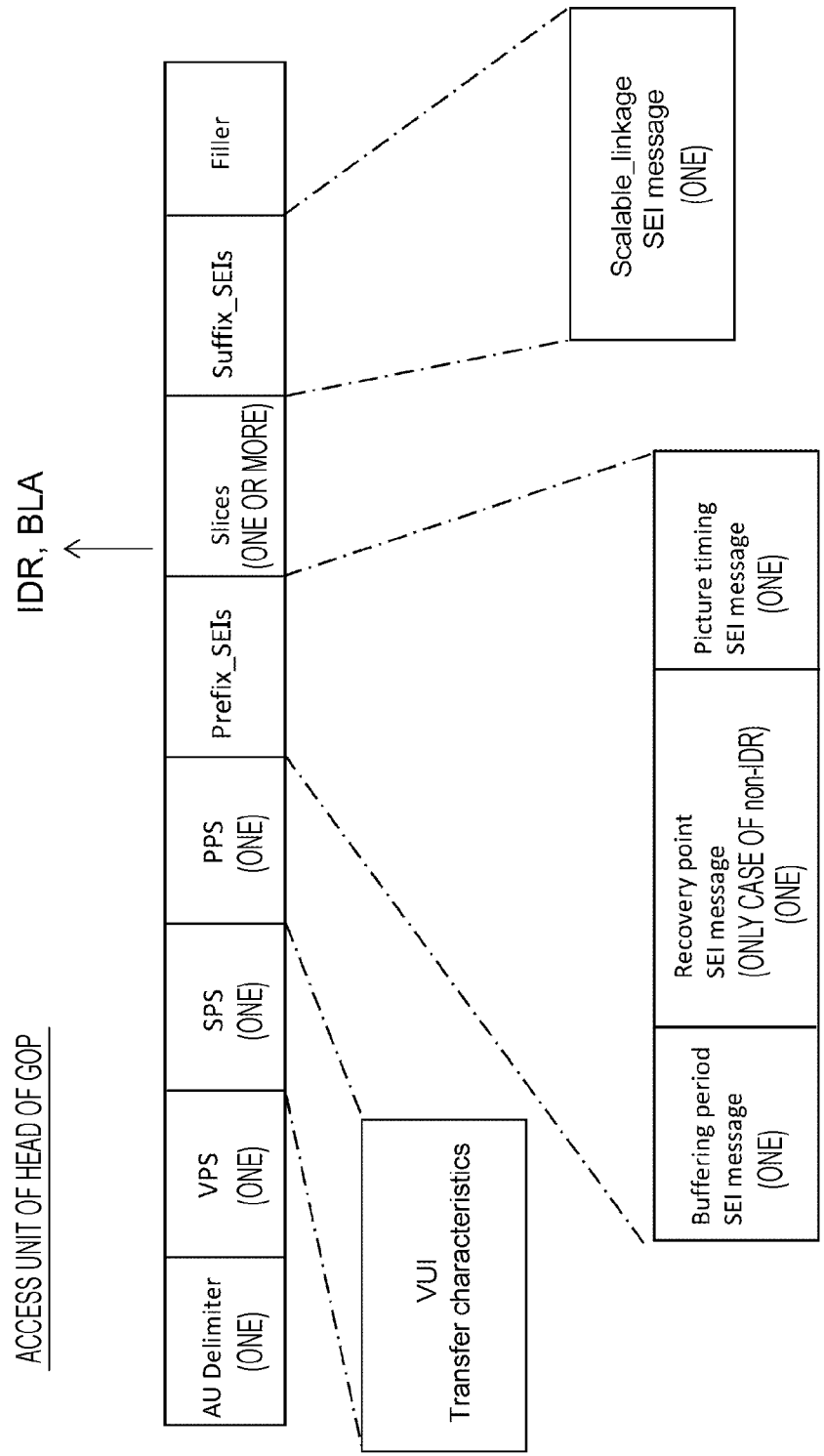

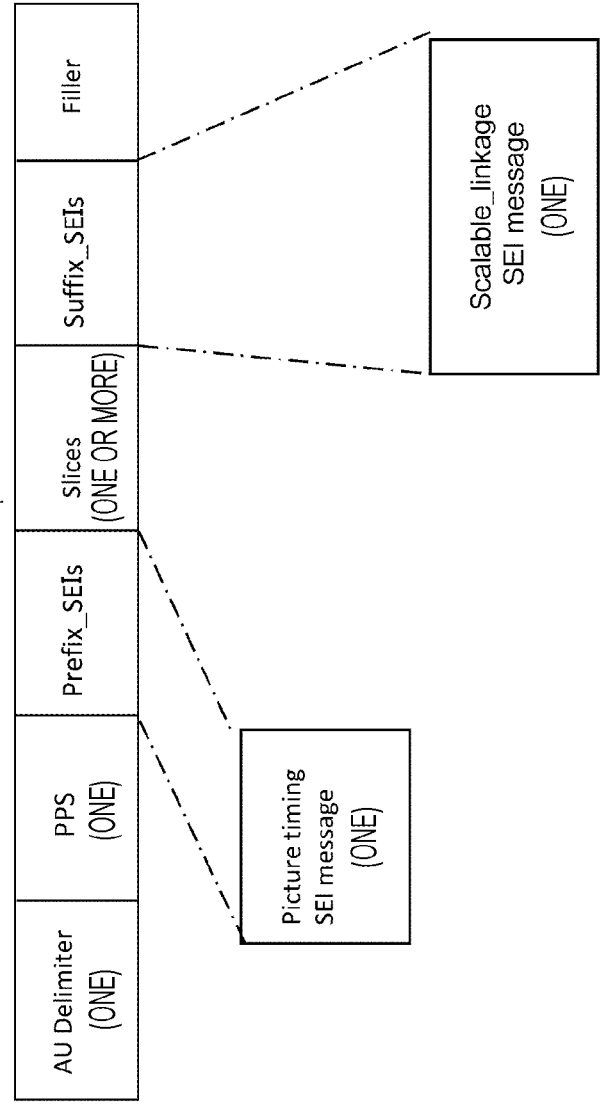

FIG. 9

Scalable_linkage SEI

| Syntax | No. of Bits | Format |
|---|---|---|
| Scalable_linkage SEI ( ) { | | |
|   Scalable_linkage_id | ue(v) | |
|   Scalable_linkage_cancel_flag | u(1) | bmlbf |
|   if( ! Scalable_linkage_cancel_flag ) { | | |
|     scalable_index | 16 | uimsbf |
|     reserved | 2 | 0x3 |
|     nuh_layer_id | 6 | uimsbf |
|     reference_level | 15 | uimsbf |
|     conversion_table_flag | 1 | bslbf |
|     if (conversion_table_flag) { | | |
|       table_size | 16 | uimsbf |
|       for ( I = 0; I < table_size ; I++ ) { | | |
|         predctrl_y[i] | 16 | uimsbf |
|         predctrl_cb[i] | 16 | uimsbf |
|         predctrl_cr[i] | 16 | uimsbf |
|       } | | |
|     } | | |
|   } | | |
| } | | |

FIG. 10

Scalable_linkage SEI semantics

| Field | Size | Description |
|---|---|---|
| scalable_index | (16bits) | INDEX INDICATING TYPE OF SCALABLE EXTENDED STREAM |
| | | 0x08  ENDED COMPONENT TO HDR |
| | | 0x10  ENDED COMPONENT TO HFR |
| | | 0x18  ENDED COMPONENT TO HDR + HFR |
| nuh_layer_id | (6bits) | INDICATING layer ID INCLUDED IN SCALABLE EXTENDED STREAM |
| reference_level | (15bits) | REFERENCE LUMINANCE L |
| conversion_table_flag | (1bit) | INDICATING BY PREDICTION ADJUSTMENT CONVERSION |
| table_size | (16bits) | INDICATING INPUT NUMBER OF PREDICTION ADJUSTM! |
| predctrl_y[i] | (16bits) | INDICATING VALUE OF PREDICTION ADJUSTMENT CONVEF |
| predctrl_cb[i] | (16bits) | INDICATING VALUE OF PREDICTION ADJUSTMENT CONVEF |
| predctrl_cr[i] | (16bits) | INDICATING VALUE OF PREDICTION ADJUSTMENT CONVEF |

FIG. 12

DECODING/DISPLAY TIMING MANAGEMENT IN A CASE OF HIERARCHICAL ENCODING

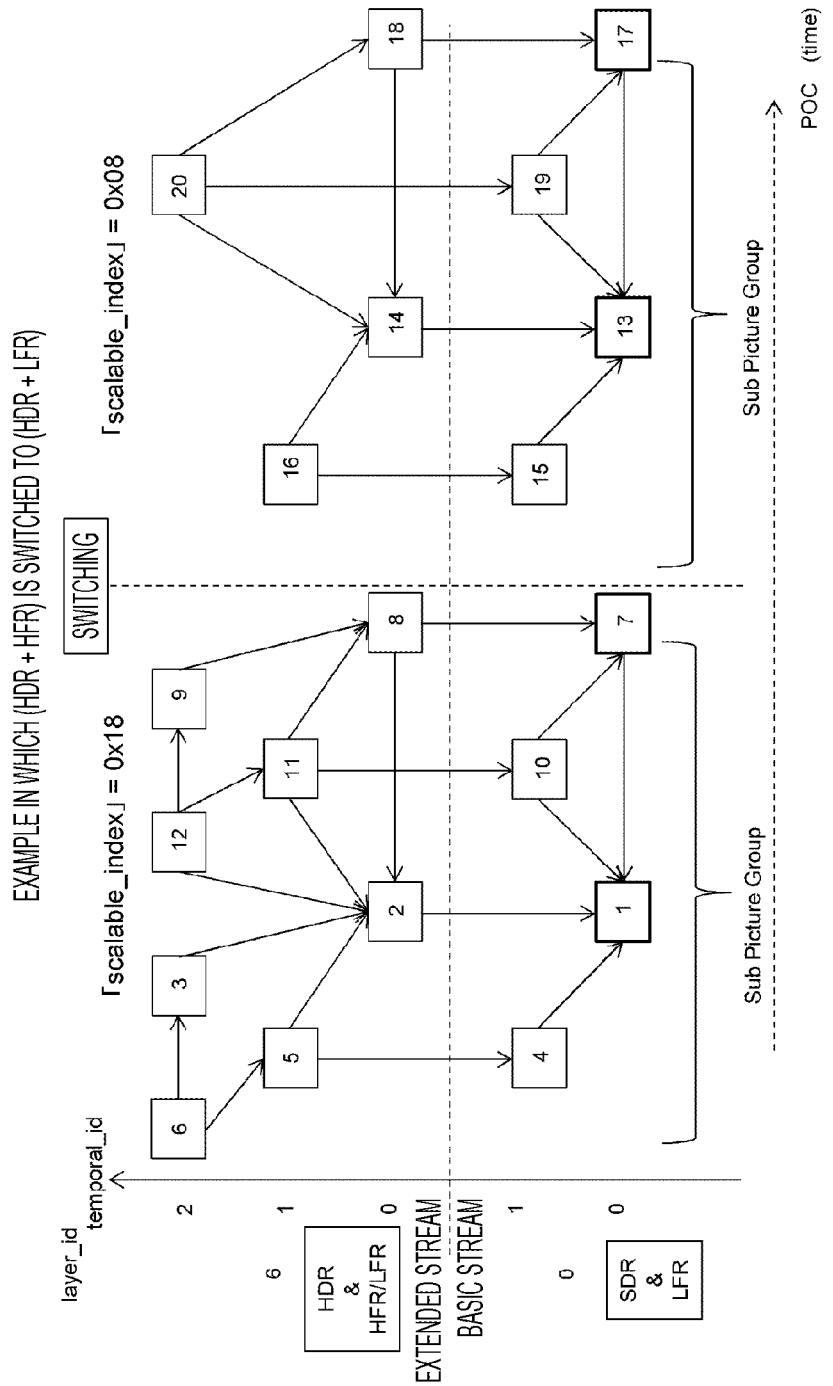

Scalable_linkage_descriptor

| Syntax | No. of Bits | Format |
|---|---|---|
| Scalable_linkage_descriptor(){ | | |
| descriptor_tag | 8 | uimsbf |
| descriptor_length | 8 | uimsbf |
| scalable_index | 16 | uimsbf |
| reserved | 2 | 0xf |
| nuh_layer_id | 6 | uimsbf |
| } | | |

*FIG. 18A*

Semantics of descriptor scalable_index (16bits)
  INDEX INDICATING TYPE OF SCALABLE EXTENDED STREAM
nuh_layer_id (6bits)
  INDICATING layer ID INCLUDED IN SCALABLE EXTENDED STF

*FIG. 18B*

CASE OF FIXING VALUE OF "nuh_layer_id" BY ENCODED COMPONENT

| Scalable_linkage_descriptor | NAL unit header | MEANING |
|---|---|---|
| scalable_index | nuh_layer_id | nuh_layer_id | |
| 5 | 0 | 0 | COMPONENT OF SDR AND HFR |
| 6 | 6 | 6 | COMPONENT OF HDR AND HFR |
| 7 | 5 | 5 | COMPONENT OF HDR AND LFR |

FIG. 19A

CASE OF FLEXIBLY ALLOCATING VALUE OF "nuh_layer_id"

| Scalable_linkage_descriptor | NAL unit header | Scalable_linkage SEI | MEANING |
|---|---|---|---|
| scalable_index | nuh_layer_id | nuh_layer_id | scalable_index | nuh_layer_id | |
| 16 (0x10) | 6 | 6 | 16 | 6 | COMPONENT OF SDR AND HFR |
| 24 (0x18) | 6 | 6 | 24 | 6 | COMPONENT OF HDR AND HFR |
| 8 (0x08) | 6 | 6 | 8 | 6 | COMPONENT OF HDR AND LFR |

FIG. 19B

TRANSMITTING DEVICE, TRANSMITTING METHOD, RECEIVING DEVICE, AND RECEIVING METHOD

CROSS REFERENCE TO RELATED APPLICATIONS

This application is a continuation of U.S. Ser. No. 15/543,428 filed Jul. 13, 2017, which is a National Stage of PCT/JP2016/053923, filed Feb. 10, 2016 and claims the benefit of Japanese Priority Patent Application JP 2015-039234 filed on Feb. 27, 2015. The entire contents of U.S. Ser. No. 15/543,428 are incorporated herein by reference.

TECHNICAL FIELD

The present technology relates to a transmitting device, a transmitting method, a receiving device, and a receiving method, and relates to a transmitting device that transmits high-quality format image data together with basic format image data, and the like.

BACKGROUND ART

Conventionally, transmission of high-quality format image data together with basic format image data and selective use of the basic format image data or the high-quality format image data at a receiving side is known. For example, Patent Document 1 describes that medium encoding is scalable performed, a base layer stream for low-resolution video service and an extended layer stream for high-resolution video service are generated, and a broadcast signal including the base layer stream and the extended layer stream is transmitted.

CITATION LIST

Patent Document

Patent Document 1: Japanese PCT National Publication No. 2008-542142

SUMMARY OF THE INVENTION

Problems to be Solved by the Invention

An objective of the present technology is to enable a receiving side to easily recognize a high-quality format corresponding to encoded image data included in an extended video stream.

Solutions to Problems

A concept of the present technology lies in a transmitting device including:
an image encoding unit configured to generate two video streams including a basic video stream including encoded image data of basic format image data, and an extended video stream including encoded image data of high-quality format image data of one type selected from among a plurality of types;
a transmitting unit configured to transmit a container of a predetermined format including the basic video stream and the extended video stream; and
an information insertion unit configured to insert information indicating a high-quality format corresponding to the encoded image data included in the extended video stream into the extended video stream and/or the container.

In the present technology, the two video streams including the basic video stream including the encoded image data of the basic format image data and the extended video stream including the encoded image data of the high-quality format image data of one type selected from a plurality of types are generated by the image encoding unit. Then, the container of a predetermined format including the basic video stream and the extended video stream is transmitted by the transmitting unit.

For example, the image encoding unit may perform, regarding the basic format image data, prediction encoding processing of an inside of the basic format image data, to obtain encoded image data, and selectively perform, regarding the high-quality format image data, prediction encoding processing of an inside of the high-quality format image data and prediction encoding processing of between the high-quality format image data and the basic format image data, to obtain encoded image data.

In this case, for example, the basic format image data may be normal dynamic range and low frame rate image data, the high-quality format image data may be any of high dynamic range and high frame rate image data, high dynamic range and low frame rate image data, and normal dynamic range and high frame rate image data, and the encoded image data of the high-quality format image data may include an encoded component of high dynamic range image data by difference information relative to normal dynamic range image data and/or an encoded component of high frame rate image data by difference information relative to low frame rate image data.

For example, the image encoding unit may perform dynamic range conversion for the normal dynamic range image data to make a difference value small when obtaining the difference information relative to the normal dynamic range image data. In this case, for example, the image encoding unit may perform the dynamic range conversion for the normal dynamic range image data on the basis of conversion information for converting a value of conversion data by a normal dynamic range photoelectric conversion characteristic into a value of conversion data by a high dynamic range photoelectric conversion characteristic.

The information (high-quality format information) indicating the high-quality format corresponding to the encoded image data of the extended video stream is inserted into the extended video stream and/or the container by the information insertion unit. For example, the extended video stream may have a NAL unit structure, and the information insertion unit may insert the high-quality format information into a header of the NAL unit.

Further, for example, the extended video stream may include a NAL unit structure, and the information insertion unit may insert the high-quality format information into an area of an SEI NAL unit. Further, for example, the container may be MPEG2-TS, and the information insertion unit may insert the high-quality format information into an inside of a video elementary stream loop corresponding to the extended video stream existing under arrangement of a program map table.

For example, the information insertion unit may further insert the conversion information into the extended video stream and/or the container. In this case, a receiving side can appropriately perform the processing of dynamic range conversion to be performed for the normal dynamic range image data in order to obtain the high dynamic range image data on the basis of the conversion information.

In this way, in the present technology, the information (high-quality format information) indicating the high-quality format corresponding to the encoded image data of the extended video stream is inserted into the extended video stream and/or the container. Therefore, the receiving side can easily recognize the high-quality format of the high-quality format image data. Then, the receiving side can obtain the image data corresponding to a display capability from the basic video stream and the extended video stream as display image data on the basis of the information and display capability information.

Note that, in the present technology, for example, the image encoding unit may cause a time indicated by a decoding timestamp to be added to encoded image data of each of pictures included in the extended video stream to be the same as or an intermediate time between times indicated by decoding timestamps to be added to encoded image data of pictures included in the basic video stream, equalize an interval between the times indicated by decoding timestamps to be added to encoded image data of pictures included in the basic video stream, and equalize an interval between the times indicated by decoding timestamps to be added to encoded image data of pictures included in the extended video stream. The interval between the decoding timestamps is equalized in this way, whereby a decoding capability at the receiving side can be efficiently used.

In addition, another concept of the present technology lies in a receiving device including:

a receiving unit configured to receive a container of a predetermined format including two video streams including a basic video stream including encoded image data of basic format image data, and an extended video stream including encoded image data of high-quality format image data of one type selected from among a plurality of types, information indicating a high-quality format corresponding to the encoded image data included in the extended video stream being inserted into the extended video stream and/or the container, and the receiving device further including:

an information extraction unit configured to extract the information from the extended video stream and/or the container; and a processing unit configured to obtain image data corresponding to a display capability from the basic video stream and the extended video stream, as display image data, on the basis of the extracted information and display capability information.

In the present technology, the receiving unit receives the container of a predetermined format including two video streams including a basic video stream including encoded image data of basic format image data, and an extended video stream including encoded image data of high-quality format image data of one type selected from among a plurality of types. For example, the encoded image data included in the basic video stream may have been generated by performing, for the basic format image data, prediction encoding processing of an inside of the basic format image data, and the encoded image data included in the extended video stream may have been generated by selectively performing, for the high-quality format image data, prediction encoding processing of an inside of the high-quality format image data and prediction encoding processing of between the high-quality format image data and the basic format image data.

The information indicating a high-quality format corresponding to the encoded image data included in the extended video stream into the extended video stream and/or the container. The information is extracted from the extended video stream and/or the container by the information extraction unit. The image data corresponding to the display capability is obtained from the basic video stream and the extended video stream as the display image data on the basis of the extracted information and the display capability information by the processing unit.

In this way, in the present technology, the image data corresponding to the display capability can be obtained from the basic video stream and the extended video stream as the display image data on the basis of the information indicating a high-quality format corresponding to the encoded image data included in the extended video stream. Therefore, the image data corresponding to the display capability can be efficiently obtained as the display image data.

Effects of the Invention

According to the present technology, a receiving side can easily recognize a high-quality format corresponding to encoded image data included in an extended video stream. Note that effects described here are not necessarily limited, and any of effects described in the present disclosure may be exhibited.

BRIEF DESCRIPTION OF DRAWINGS

FIG. 6A and FIG. 6B are diagrams illustrating a structure example of a NAL unit header and content of principal parameters of the structure example.

FIG. 7 is a diagram illustrating an access unit of a head of a GOP in a case where an encoding method is HEVC.

FIG. 8 is a diagram illustrating an access unit of other than the head of the GOP in the case where an encoding method is HEVC.

FIG. 9 is a diagram illustrating a structure example of a scalable linkage SEI message.

FIG. 10 is a diagram illustrating content of principal information in the structure example of a scalable linkage SEI message.

FIG. 12 is a diagram for describing management of decoding and display timing (timestamps of decoding and display) in encoded image data.

FIG. 17 is a diagram illustrating configuration examples ("HDR+HFR"→"HDR+LFR") of encoded image data of a basic video stream BS and encoded image data of an extended video stream ES.

FIG. 18A and FIG. 18B are diagrams illustrating a structure example of scalable linkage descriptor, and content of principal information in the structure example.

FIG. 19A and FIG. 19B are diagrams illustrating examples of values of fields in a case where a value of "nuh_layer_id" of a header of a NAL unit is fixed by an encoded component, and in a case where the value of "nuh_layer_id" of a header of a NAL unit is flexibly allocated.

MODE FOR CARRYING OUT THE INVENTION

Figure 1:
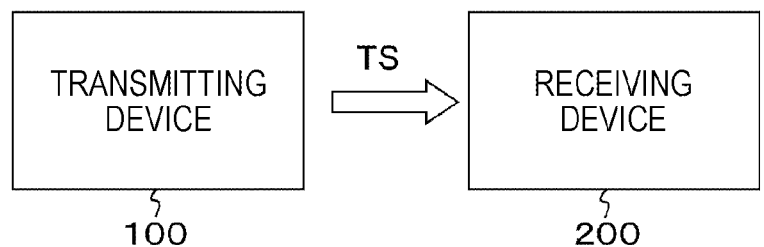
FIG. 1 is a block diagram illustrating a configuration example of a transmitting and receiving system as an embodiment.

Hereinafter, a form for implementing the invention (hereinafter, referred to as "embodiment") will be described. Note that description will be given in the following order:
1. Embodiment
2. Modification 1. Embodiment Transmitting and Receiving System FIG. 1 illustrates a configuration example of a transmitting and receiving system 10 as an embodiment. The transmitting and receiving system 10 includes a transmitting device 100 and a receiving device 200. The transmitting device 100 transmits a transport stream TS as a container on a broadcast wave packet or a network packet.

The transport stream TS includes two video streams including a basic video stream and an extended video stream. The basic video stream has encoded image data of basic format image data. The basic format image data is normal dynamic range and low frame rate image data. The encoded image data of the basic format image data is generated by applying prediction encoding processing such as H.264/AVC or H.265/HEVC to the basic format image data. In this case, the encoded image data is obtained by performing the prediction encoding processing of an inside of the basic format image data.

The extended video stream has encoded image data of high-quality format image data of one type selected from a plurality of types. In this embodiment, the high-quality format image data is any of high dynamic range and high frame rate image data, high dynamic range and low frame rate image data, and normal dynamic range and high frame rate image data.

The encoded image data of the extended video stream is generated by applying the prediction encoding processing such as H.264/AVC or H.265/HEVC to the high-quality format image data. In this case, the encoded image data is obtained by selectively performing the prediction encoding processing of an inside of the high-quality format image data or the prediction encoding processing of between the high-quality format image data and the basic format image data.

In this case, the encoded image data of the high-quality format image data has an encoded component of high dynamic range image data by difference information relative to normal dynamic range image data and/or an encoded component of high frame rate image data by difference information relative to low frame rate image data.

The transmitting device 100 inserts information indicating a high-quality format corresponding to the encoded image data of the extended video stream (hereinafter, the information is appropriately referred to as "high-quality format" information) into a transport stream TS as the extended video stream and/or the container. The information is inserted into a header of a NAL unit or into an area of an SEI NAL unit. Further, the information is inserted into a video elementary stream loop corresponding to the extended video stream existing under arrangement of a program map table.

The receiving device 200 receives the transport stream TS sent on a broadcast wave packet or a network packet from the transmitting device 100. The transport stream TS includes the basic video stream having the encoded image data of the basic format image data and the extended video stream having the encoded image data of the high-quality format image data, as described above.

The high-quality format information is inserted into the transport stream TS as the extended video stream and/or the container, as described above. The receiving device 200 acquires image data corresponding to a display capability from the basic video stream and the extended video stream, as display image data, on the basis of the information and display capability information.

Configuration of Transmitting Device

Figure 2:
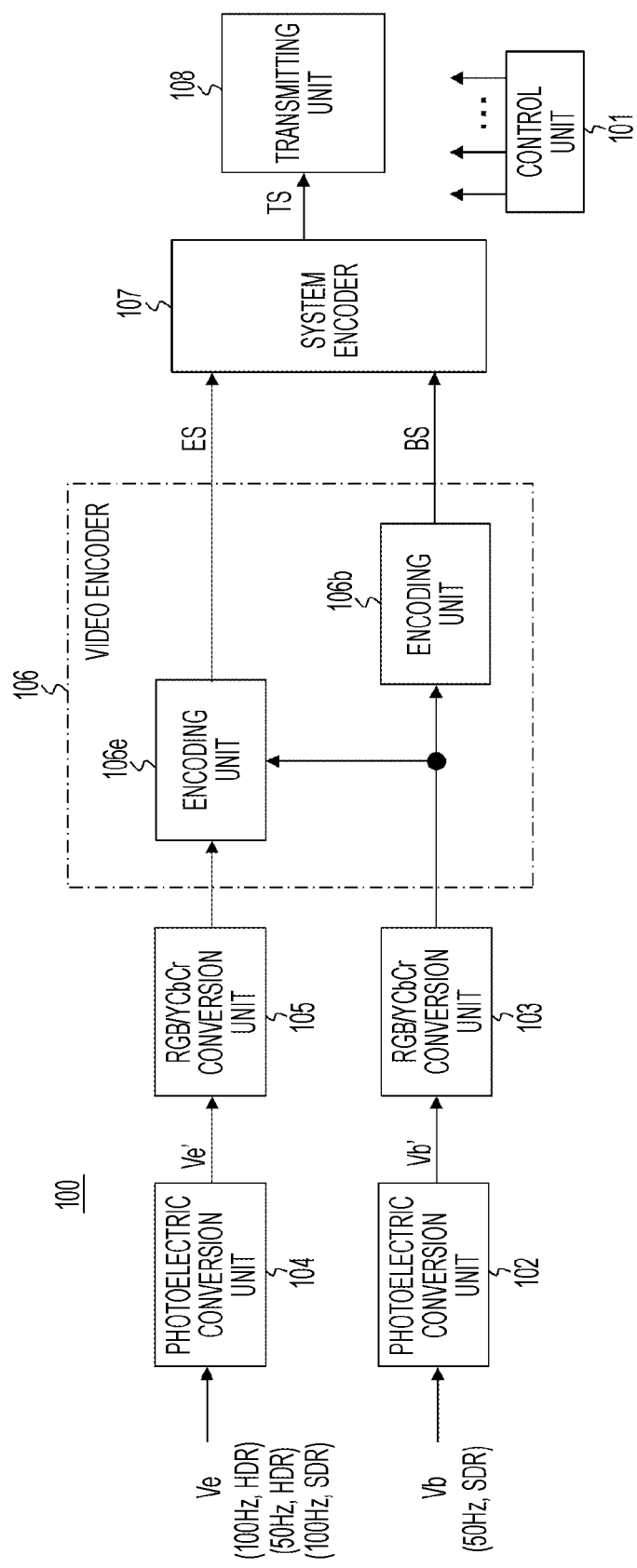
FIG. 2 is a block diagram illustrating a configuration example of a transmitting device.

FIG. 2 illustrates a configuration example of the transmitting device 100. The transmitting device 100 handles basic format image data Vb and high-quality format image data Ve as transmission image data. Here, the basic format image data Vb is standard dynamic range (SDR) image data having a frame frequency of 50 Hz (low frame rate:LFR).

The high-quality format image data Ve is high-quality format image data of one type selected from three types including (a) HDR image data having the frame frequency of 100 Hz (high frame rate: HFR), (b) HDR image data having the frame frequency of 50 Hz (LFR), and (c) SDR image data having the frame frequency of 100 Hz (HFR), for example. The HDR image data has luminance of 0 to 100%*N, for example, 0 to 1000%, or a range of more than 0 to 1000%, where brightness of a white peak of a conventional LDR image is 100%.

Figure 3:
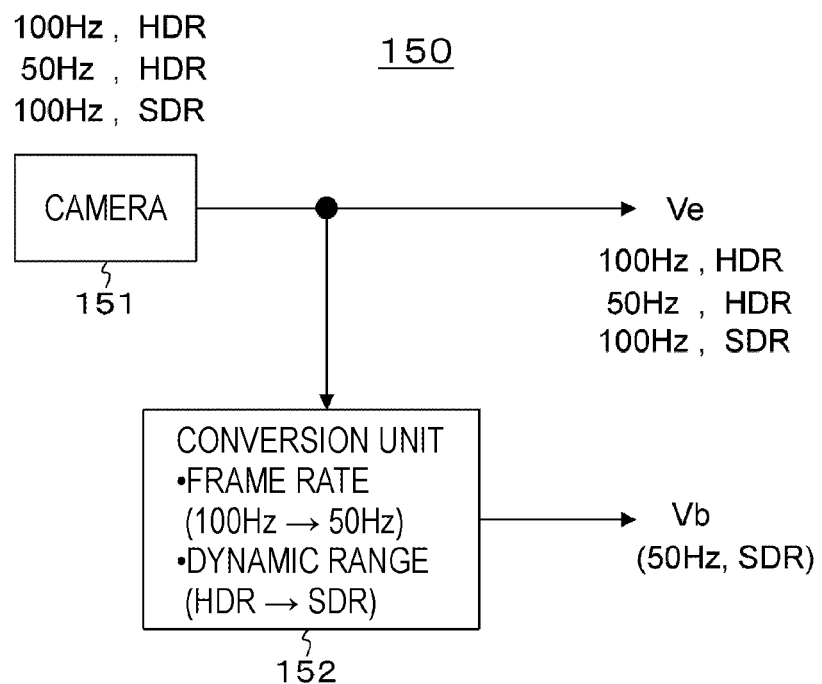
FIG. 3 is a block diagram illustrating a configuration example of an image data generation unit that generates basic format image data Vb and high-quality format image data Ve.

FIG. 3 illustrates a configuration example of an image data generation unit 150 that generates the basic format image data Vb and the high-quality format image data Ve. The image data generation unit 150 includes a camera 151 and a conversion unit 152.

The camera 151 images an object and outputs the high-quality format image data Ve. In a case where the high-quality format image data Ve output by the camera 151 is the HDR image data having the frame frequency of 100 Hz, the conversion unit 152 performs conversion of the frame rate and the dynamic range, and outputs the basic format image data Vb that is SDR image data having the frame frequency of 50 Hz.

Further, in a case where the high-quality format image data Ve output by the camera 151 is the HDR image data having the frame frequency of 50 Hz, the conversion unit 152 performs only the conversion of the dynamic range, and outputs the basic format image data Vb that is the SDR image data having the frame frequency of 50 Hz. Further, in a case where the high-quality format image data Ve output by the camera 151 is the SDR image data having the frame frequency of 100 Hz, the conversion unit 152 performs only the conversion of the frame rate, and outputs the basic format image data Vb that is the SDR image data having the frame frequency of 50 Hz.

Referring back to FIG. 2, the transmitting device 100 includes a control unit 101, a photoelectric conversion unit 102, an RGB/YCbCr conversion unit 103, a photoelectric conversion unit 104, an RGB/YCbCr conversion unit 105, a video encoder 106, a system encoder 107, and a transmitting unit 108. The control unit 101 includes a central processing unit (CPU), and controls operations of the respective units of the transmitting device 100 on the basis of a control program.

The photoelectric conversion unit 102 applies an SDR photoelectric conversion characteristic (SDR OETF curve) to the basic format image data Vb to obtain basic format image data Vb' for transmission. The RGB/YCbCr conversion unit 103 converts the basic format image data Vb' from an RGB domain into a luminance and chrominance (YCbCr) domain.

The photoelectric conversion unit 104 applies an HDR photoelectric conversion characteristic (HDR OETF curve) or the SDR photoelectric conversion characteristic (SDR OETF curve) to the high-quality format image data Ve to obtain high-quality format image data Ve' for transmission. The RGB/YCbCr conversion unit 105 converts the high-quality format image data Ve' from the RGB domain into the luminance and chrominance (YCbCr) domain.

The video encoder 106 includes an encoding unit 106$b$ and an encoding unit 106$e$. The encoding unit 106$b$ applies the prediction encoding processing such as H.264/AVC or H.265/HEVC to the basic format image data Vb' for transmission to obtain encoded image data, and generates a basic video stream (video elementary stream) BS having the encoded image data.

The encoding unit 106$e$ applies the prediction encoding processing such as H.264/AVC or H.265/HEVC to the high-quality format image data Ve' for transmission to obtain encoded image data, and generate an extended video stream (video elementary stream) ES having the encoded image data. In this case, the encoding unit 106$e$ selectively performs prediction of an inside of the image data Ve' and prediction between the image data Ve' and the image data Vb', for each encoded block, to make a prediction residual small.

Figure 4:
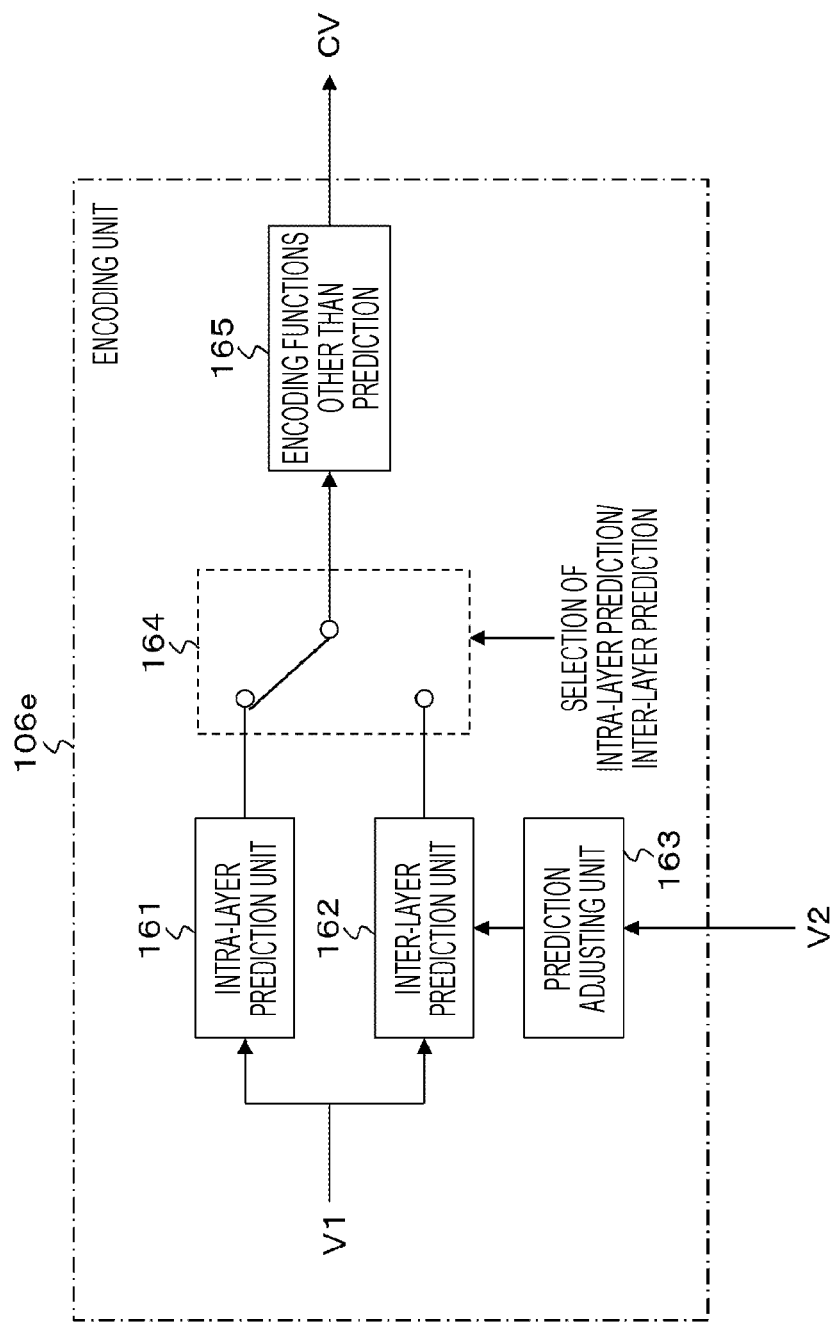
FIG. 4 is a block diagram illustrating a configuration example of principal portions of an encoding unit.

FIG. 4 illustrates a configuration example of principal portions of the encoding unit 106$e$. The encoding unit 106$e$ includes an intra-layer prediction unit 161, an inter-layer prediction unit 162, a prediction adjustment unit 163, a selection unit 164, and an encoding function unit 165.

The intra-layer prediction unit 161 performs, for image data V1 to be encoded, prediction (intra-layer prediction) inside the image data V1 to obtain prediction residual data. The inter-layer prediction unit 162 performs, for the image data V1 to be encoded, prediction (inter-layer prediction) between the image data V1 and image data V2 to be referred to obtain prediction residual data.

The prediction adjustment unit 163 performs processing below according to a type of scalable extension of the image data V1 relative to the image data V2 in order to efficiently perform the inter-layer prediction in the inter-layer prediction unit 162. That is, in a case of dynamic range extension, the prediction adjustment unit 163 performs level adjustment (dynamic range conversion) for converting the data from SDR to HDR. In a case of frame rate extension, the prediction adjustment unit 163 bypasses the processing.

Figure 5:
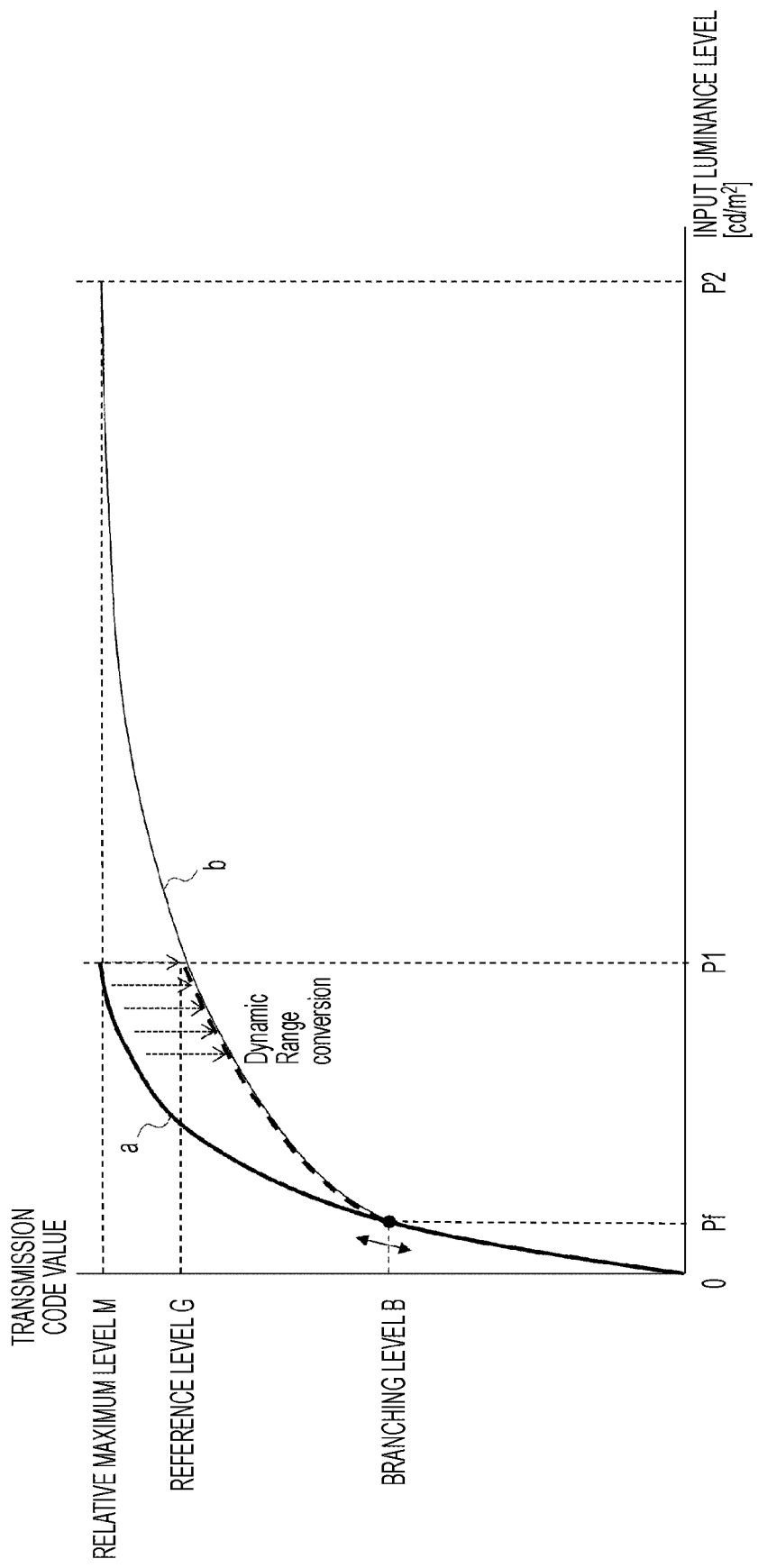
FIG. 5 is a diagram for describing level adjustment (dynamic range conversion) in a case of dynamic range extension.

Referring to FIG. 5, the level adjustment (dynamic range conversion) in the case of dynamic range extension will be further described. The solid line a illustrates an example of the SDR OETF curve indicating the SDR photoelectric conversion characteristic. The solid line b illustrates an example of the HDR OETF curve indicating the HDR photoelectric conversion characteristic. The horizontal axis represents an input luminance level, P1 indicates an input luminance level corresponding to an SDR maximum level, and P2 indicates an input luminance level corresponding to an HDR maximum level.

Further, the vertical axis represents a relative value of a transmission code value or a normalized coded level. A relative maximum level M indicates the HDR maximum level and the SDR maximum level. A reference level G indicates a transmission level of HDR OETF in the input luminance level P1 corresponding to the SDR maximum level, and means a so-called reference white level. A branching level B indicates a level at which the SDR OETF curve and the HDR OETF curve branch and are separated from the same orbit. Pf indicates an input luminance level corresponding to a branching level. Note that the branching level B can be an arbitrary value of 0 or more.

In the level adjustment (dynamic range conversion) in the prediction adjustment unit 163, data at the branching level B to the relative maximum level M, of the basic format image data Vb', are converted to have values of conversion data by the HDR photoelectric conversion characteristic. In this case, the relative maximum level M of SDR is converted to accord with the reference level G. Note that input data of less than the branching level B is output as output data as it is.

Here, conversion information is provided by a conversion table or a conversion coefficient. In a case where the conversion information is provided by a conversion table, the prediction adjustment unit 163 performs conversion by reference to the conversion table. On the other hand, in a case where the conversion information is provided by a conversion efficient, the prediction adjustment unit 163 performs conversion by calculation using the conversion efficient. For example, the prediction adjustment unit 163 performs conversion by the following formula (1), regarding the input data from the branching level B to the relative maximum level M, where the conversion coefficient is C:

$$\text{The output data}=\text{the branching level } B+(\text{the input data}-\text{the branching level } B)*C \qquad (1)$$

The selection unit 164 selectively takes out the prediction residual data obtained in the intra-layer prediction unit 161 or the prediction residual data obtained in the inter-layer prediction unit 162, for each encoded block, and sends the prediction residual data to the encoding function unit 165. In this case, the selection unit 164 takes out the prediction residual data having a smaller prediction residual, for example. The encoding function unit 165 performs encoding processing such as conversion encoding, quantization, and entropy encoding for the prediction residual data taken out by the selection unit 164, to obtain encoded image data CV.

The encoded image data included in the extended video stream includes an encoded component of a type according to the high-quality format image data Ve. That is, in a case where the image data Ve is (a) HFR (100 Hz) and HDR image data, an HDR and HFR encoded component is included. Further, in a case where the image data Ve is (b) LFR (50 Hz) and HDR image data, an HDR and LFR encoded component is included. Further, in a case where the image data Ve is (c) HFR (100 Hz) and SDR image data, an SDR and HFR encoded component is included.

Referring back to FIG. 2, the encoding unit 106e inserts the information (high-quality format information) indicating a high-quality format corresponding to the encoded image data of the extended video stream into the extended video stream ES. The encoding unit 106e inserts the high-quality format information into a header of a NAL unit or into an area of an SEI NAL unit, for example.

FIG. 6A illustrates a structure example (syntax) of a NAL unit header, and FIG. 6B illustrates content (semantics) of principal parameters in the structure example. A 1-bit field of "forbidden zero bit" requires 0. A 6-bit field of "nal_unit_type" indicates a NAL unit type. A 6-bit field of "nuh_layer_id" indicates an ID of an extended layer. A 3-bit field of "nuh_temporal_id_plus1" indicates temporal_id (0 to 6), and takes a value (1 to 7) obtained by adding 1 to the temporal_id.

In the basic video stream, a value of "nuh_layer_id" is "0". When the high-quality format information is inserted into the header of the NAL unit, the value of "nuh_layer_id" is fixed with a type of an encoded component included in the encoded image data, in the extended video stream. That is, the value of "nuh_layer_id" is a fixed value according to the type of the high-quality format corresponding to the encoded image data.

At this time, "nuh_layer_id" configures the high-quality format information. For example, in a case where the encoded component included in the encoded image data is the HDR and HFR encoded component, "nuh_layer_id" is "6". Further, in a case where the encoded component included in the encoded image data is the HDR and LFR encoded component, "nuh_layer_id" is "5". Further, in a case where the encoded component included in the encoded image data is the SDR and HFR encoded component, "nuh_layer_id" is "0".

Meanwhile, in the extended video stream, in a case of flexibly allocating the value of "nuh_layer_id", the high-quality format information is inserted into the SEI NAL unit. In this case, "nuh_layer_id" does not have a function to directly indicate the high-quality format corresponding to the encoded image data of the extended video stream.

At this time, the encoding unit 106e inserts a newly defined scalable linkage SEI message (Scalable linkage SEI message) having the high-quality format information into the portion of "SEIs" of the access unit (AU).

FIG. 7 illustrates an access unit of a head of a group of pictures (GOP) in a case where an encoding method is HEVC. Further, FIG. 8 illustrates an access unit of other than the head of the GOP in the case where an encoding method is HEVC. In an case of an HEVC encoding method, an SEI message group "Prefix_SEIs" for decoding is arranged before slices with encoded pixel data, and a SEI message group "Suffix_SEIs" for display is arranged after the slices. The scalable linkage SEI message is arranged as the SEI message group "Suffix_SEIs" or "Prefix SEIs", for example, as illustrated in FIGS. 7 and 8.

FIG. 9 illustrates a structure example (syntax) of the scalable linkage SEI message. FIG. 10 illustrates content (semantics) of principal information in the structure example. One-bit flag information of "Scalable linkage cancel flag" indicates whether refreshing the SEI message of "Scalable linkage" SEI message. "0" indicates refreshing the SEI message. "1" indicates not refreshing the SEI message, that is, maintaining the previous message as it is.

In a case where "Scalable linkage cancel flag" is "0", the following fields exist. A 16-bit field of "scalable_index" is an index indicating a type of a scalable extension stream. That is, this field configures the high-quality format information.

For example, "0x8" indicates the extended component to HDR, that is, the encoded component included in the encoded image data being the HDR and LFR encoded component. Further, "0x10" indicates the extended component to HFR, that is, the encoded component included in the encoded image data being the SDR and HFR encoded component. Further, "0x18" indicates the extended component to HDR and HFR, that is, the encoded component included in the encoded image data being the HDR and HFR encoded component.

A 6-bit field of "nuh_layer_id" indicates a layer ID included in the extended video stream. A 15-bit field of "reference level" indicates a reference luminance level value, that is, the reference level G (see FIG. 5). One-bit flag information of "conversion table flag" indicates by the conversion table, that is, existence of conversion table information.

In a case where "conversion table flag" is "1", 8-bit field of "table size" exists. This field indicates the number of inputs to the conversion table. Then, respective 16-bit fields of "predctrl_y[i]", "predctrl_cb[i]", and "predctrl_cr[i]" exist by the number of inputs. The field of "predctrl_y[i]" indicates a value of prediction adjustment conversion regarding luminance. The field of "predctrl_cb[i]" indicates a value of prediction adjustment conversion regarding chrominance Cb. The field of "predctrl_cr[i]" indicates a value of prediction adjustment conversion regarding chrominance Cr.

Figure 11:
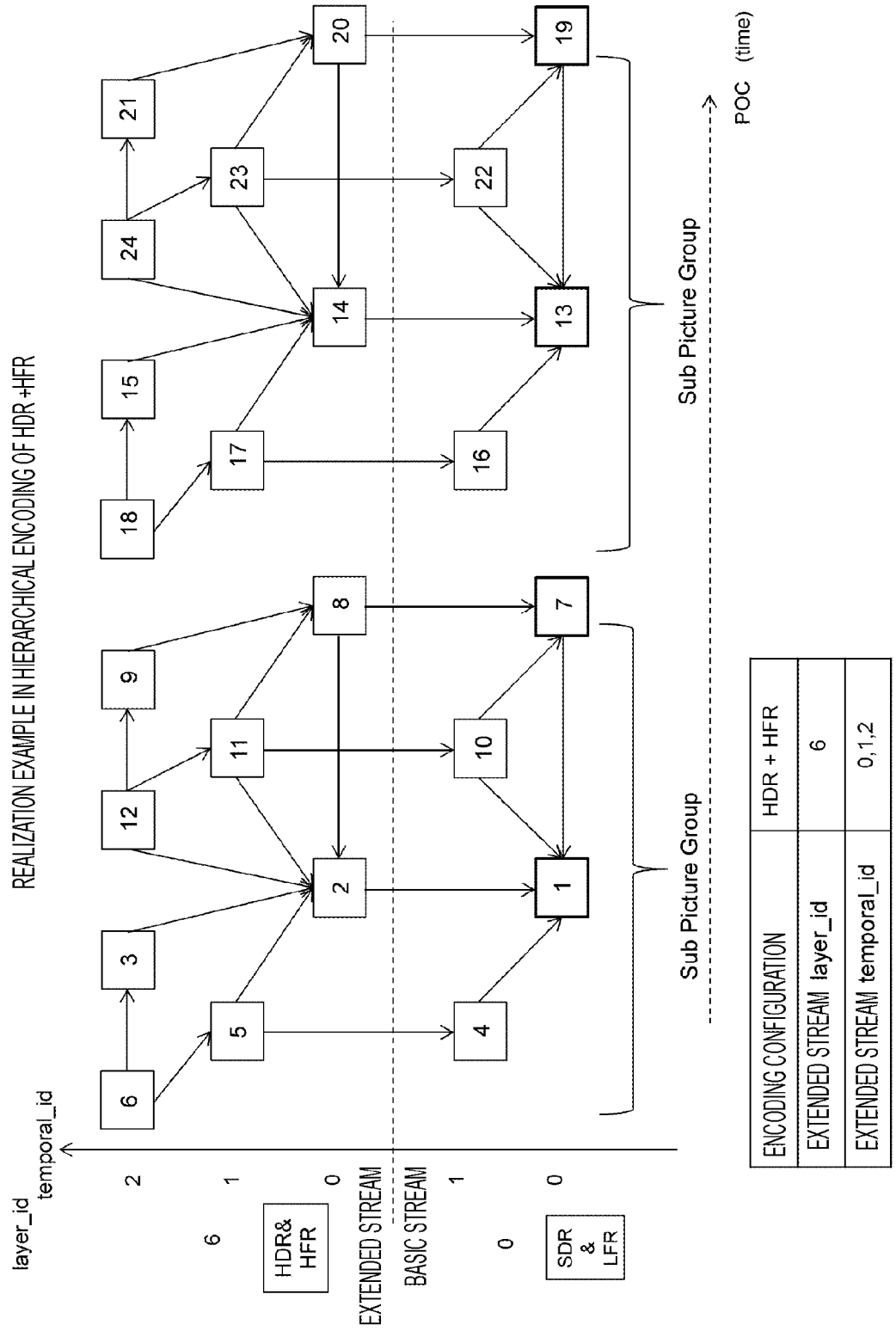
FIG. 11 is a diagram illustrating configuration examples (HDR+HFR) of encoded image data of a basic video stream BS and an encoded image data of an extended video stream ES.

FIG. 11 illustrates configuration examples of the encoded image data of the basic video stream BS obtained in the encoding unit 106b, and the encoded image data of the extended video stream ES obtained in the encoding unit 106e. In this example, an SDR and LFR encoded component is included in the encoded image data of the basic video stream BS, and an HDR and HFR encoded component is included in the encoded image data of the extended video stream ES. In this example, the value of "nuh_layer_id" is fixed by the type of the encoded component included in the encoded image data, and "nuh_layer_id" configures the high-quality format information.

The horizontal axis represents a picture order of composition (POC), and the display time on the left side advances first and the right side follows the left side. The vertical axis represents a hierarchy. Each of the square frames indicates a picture, and each of the arrows indicates a reference relationship between pictures in the prediction encoding processing. In both the inter-layer prediction and the intra-layer prediction, a current picture is changed in each block, and the direction and the number of references of the prediction is not limited to the illustrated examples. The numbers in the square frames indicate the order of pictures to be encoded, that is, an encoding order (a decoding order at the receiving side). Some sub groups of pictures are put together to form a group of pictures (GOP).

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in three hierarchies of 0, 1, and 2. 0, 1, and 2 are respectively set as temporal_ids (hierarchical identification information) arranged in the headers of the NAL units (nal_units) that configure the encoded image data of pictures of hierarchies 0, 1, and 2. Further, the values of "nuh_layer_id" of the headers of the NAL units are "6", and indicates that the encoded component included in the encoded image data is the HDR and HFR encoded component.

FIG. 12 is a schematically illustrating management of decoding and display timing (timestamps of decoding and display) in a case of the hierarchical encoding of FIG. 11. The numbers correspond to the numbers in the square frames in FIG. 11, the numbers indicating the pictures.

"B" indicates a picture that configures a basic frame frequency. "L" indicates a picture component of the basic frame frequency, and the dynamic range is a prediction difference from the basic video stream BS. "U" indicates a frame positioned at intermediate timing between frames of the basic frame frequency, and becomes a high frame frequency by being temporally composed with the frame "L" or "B". Further, "U" can have a difference component from the frame "B" or "L" in the dynamic range, and becomes a high dynamic range by being composed with the frame "B" or "L."

In the management of decoding timing (decoding timestamp), encoding buffer management (HRD management) is performed such that decoding of "B" and "L" is performed at the same time, an decoding of "U is performed at intermediate timing between decoding times of "B" or "L" before and after "U". In display timing (display timestamp), the encoding buffer management (HRD management) is similarly performed such that "B" and "L" are predicted, composed, and displayed at the same time, and "U" is displayed at intermediate timing between display times of basic frame frequency images before and after "U".

Note that management of decoding and display timing (timestamps of decoding and display) is similarly performed in other configuration examples below although detailed description is omitted.

Figure 13:
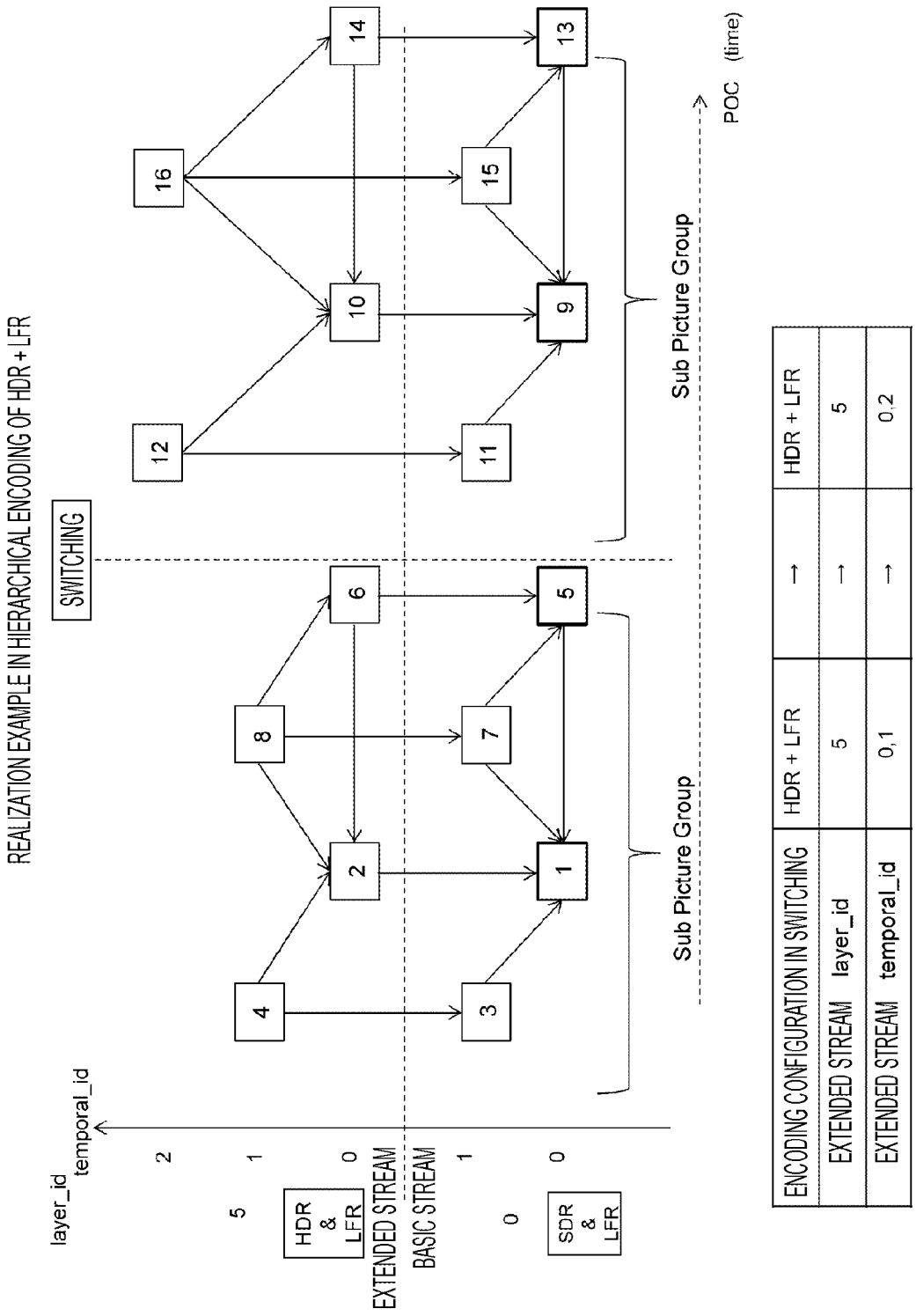
FIG. 13 is a diagram illustrating configuration examples (HDR+LFR) of encoded image data of a basic video stream BS and encoded image data of an extended video stream ES.

FIG. 13 also illustrates configuration examples of the encoded image data of the basic video stream BS obtained in the encoding unit 106b, and the encoded image data of the extended video stream ES obtained in the encoding unit 106e. In this example, the SDR and LFR encoded component is included in the encoded image data of the basic video stream BS, and the HDR and LFR encoded component is included in the encoded image data of the extended video stream ES. In this example, the value of "nuh_layer_id" is fixed by the type of the encoded component included in the encoded image data, and "nuh_layer_id" configures the high-quality format information.

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in two hierarchies of 0 and 1 in the sub group of pictures before switching, and 0 and 1 are respectively set as temporal_ids (hierarchical identification information) to be arranged in the headers of the NAL units (nal_units) that configure the encoded image data of pictures of the hierarchies 0 and 1.

The hierarchical encoding is performed in two hierarchies of 0 and 2 in the sub group of pictures after switching, and 0 and 2 are respectively set as temporal_ids (hierarchical identification information) to be arranged in the headers of the NAL units (nal_units) that configure the encoded image data of pictures of the hierarchies 0 and 2. Further, values of "nuh_layer_id" of the headers of the NAL units are "5", indicating that the encoded component included in the encoded image data is the HDR and LFR encoded component.

Figure 14:
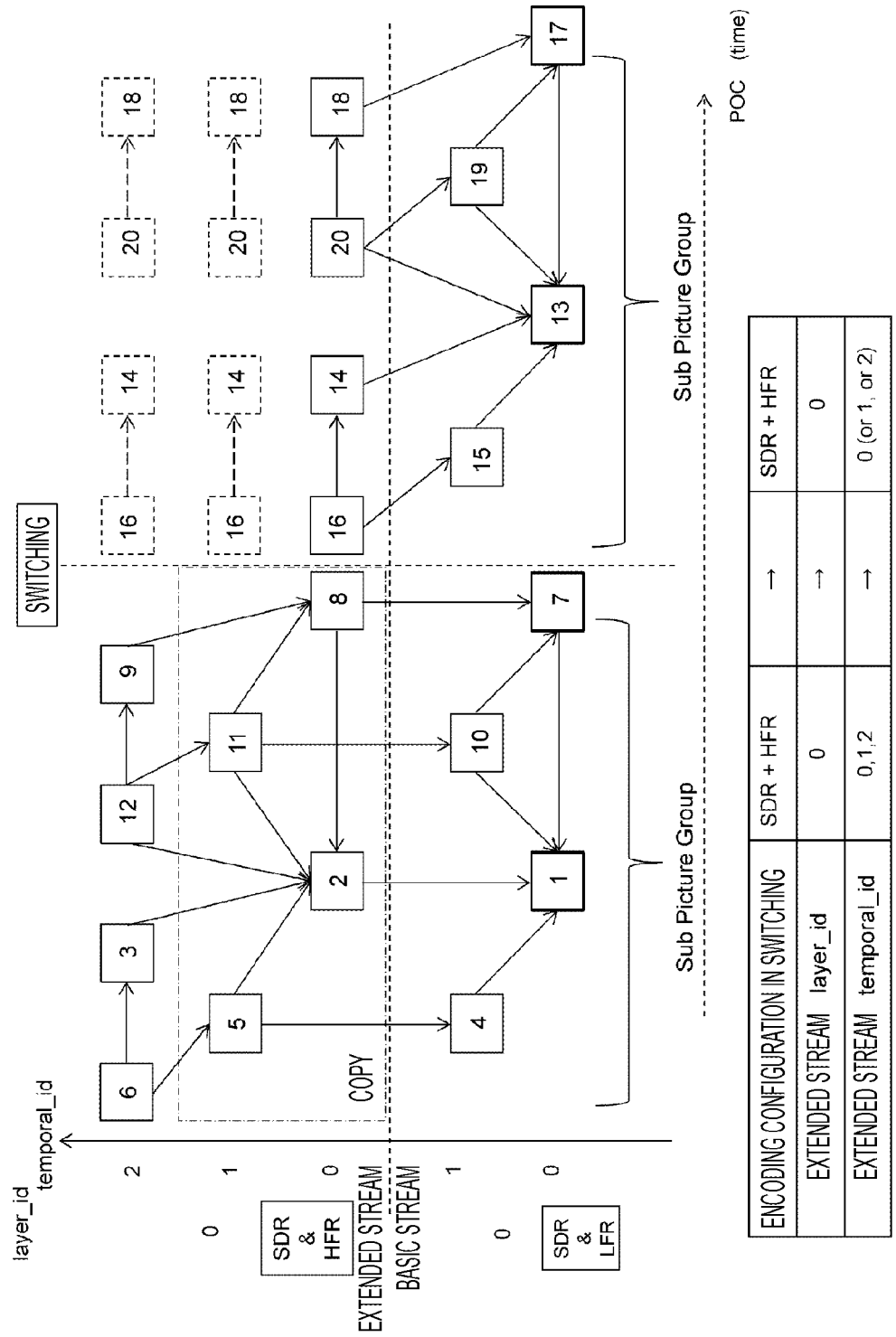
FIG. 14 is a diagram illustrating configuration examples ("SDR+HFR") of encoded image data of a basic video stream BS and encoded image data of an extended video stream ES.

FIG. 14 also illustrates configuration examples of the encoded image data of the basic video stream BS obtained in the encoding unit 106b, and the encoded image data of the extended video stream ES obtained in the encoding unit 106e. In this example, the SDR and LFR encoded component is included in the encoded image data of the basic video stream BS, and the SDR and HFR encoded component is included in the encoded image data of the extended video stream ES. In this example, the value of "nuh_layer_id" is fixed by the type of the encoded component included in the encoded image data, and "nuh_layer_id" configures the high-quality format information.

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in three hierarchies of 0, 1, and 2 in the sub group of pictures before switching, and 0, 1, and 2 are respectively set as temporal_ids (hierarchical identification information) arranged in the headers of the NAL units (nal_units) that configure the encoded image data of pictures of hierarchies 0, 1, and 2. Here, the pictures "2", "5", "8", and "11" are respectively copies of pictures "1", "4", "7", and "10", the picture "3" refers to the picture "2", and the picture "6" refers to the picture "5".

The hierarchical encoding is performed in one hierarchy of 0 in the sub group of pictures after switching, and 0 is set as temporal_id (hierarchical identification information) to be arranged in the header of the NAL unit (nal_unit) that configures the encoded image data of the picture of the hierarchy 0. Note that, as illustrated by the broken lines, one hierarchy of hierarchy 1 or one hierarchy or hierarchy 2 can be used. Further, values of "nuh_layer_id" of the headers of the NAL units are "0", indicating that the encoded component included in the encoded image data is the SDR and HFR encoded component.

Figure 15:
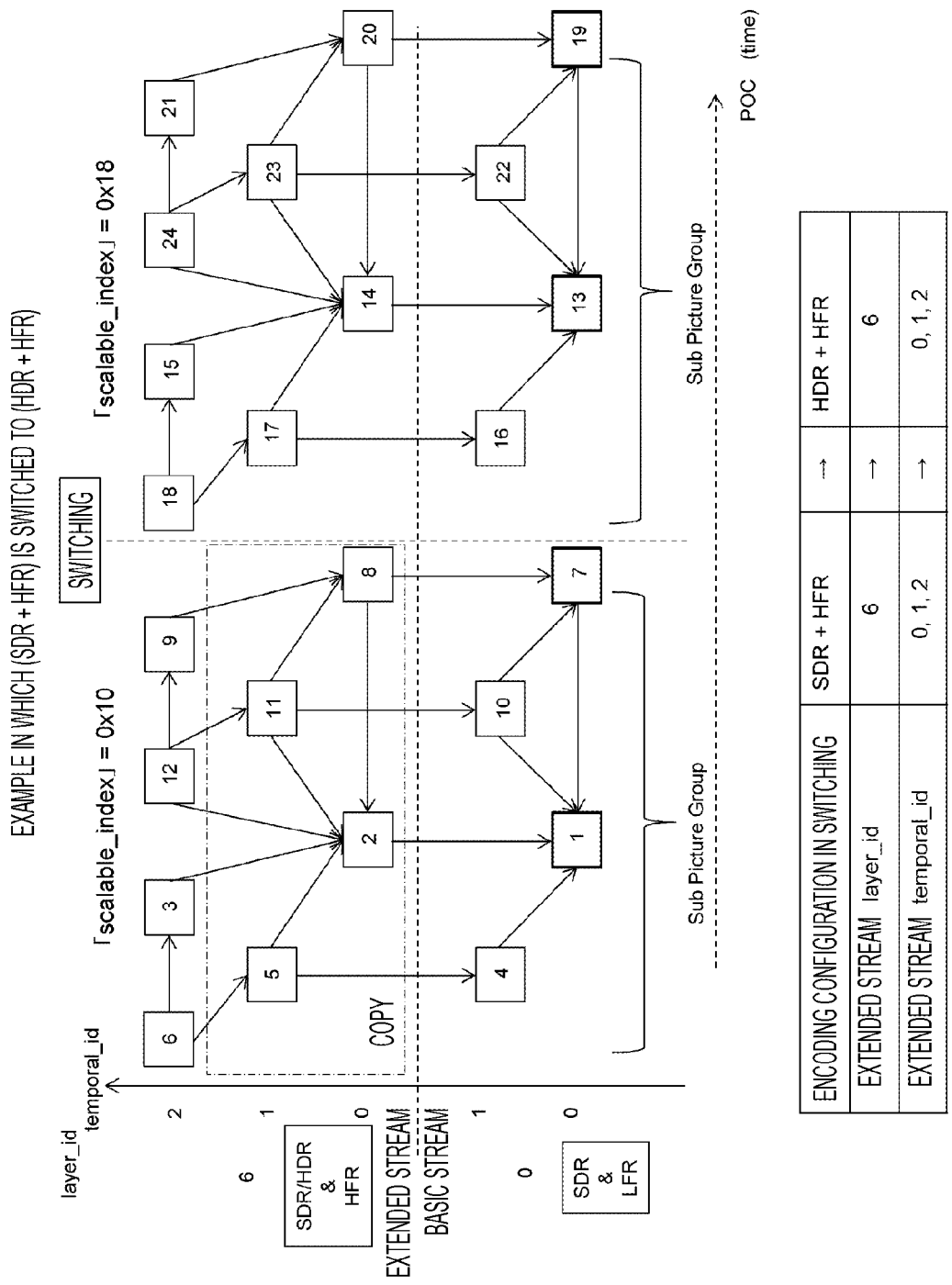
FIG. 15 is a diagram illustrating configuration examples ("SDR+HFR"→"HDR+HFR") of encoded image data of a basic video stream BS and encoded image data of an extended video stream ES.

FIG. 15 also illustrates configuration examples of the encoded image data of the basic video stream BS obtained in the encoding unit 106b, and the encoded image data of the extended video stream ES obtained in the encoding unit 106e. In this example, the SDR and LFR encoded component is included in the encoded image data of the basic video stream BS, the SDR and HFR encoded component is included in the encoded image data of the extended video stream ES before switching, and the HDR and HFR encoded component is included after switching.

In this example, the value of "nuh_layer_id" is flexibly allocated, and "nuh_layer_id" does not configure the high-quality format information. That is, this example is an example in which "scalable_index" of the scalable linkage SEI message configures the high-quality format information.

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in three hierarchies of 0, 1, and 2 in the sub group of pictures before switching, and 0, 1, and 2 are respectively set as temporal_ids (hierarchical identification information) arranged in the headers of the NAL units (nal_units) that configure the encoded image data of pictures of hierarchies 0, 1, and 2. Here, the pictures "2", "5", "8", and "11" are respectively copies of the pictures "1", "4", "7", and "10", the picture "3" refers to the picture "2", and the picture "6" refers to the picture "5".

The hierarchical encoding is performed in three hierarchies of 0, 1, and 2 in the sub group of pictures after switching, and 0, 1, and 2 are set as temporal_ids (hierarchical identification information) to be arranged in the headers of NAL units (nal_units) that configure the encoded image data of pictures of hierarchies 0 and 1, 2. Here, the pictures "14", "17", "20", and "23" are respectively pictures of HDR difference of the pictures "13", "16", "19", and "22".

Values of "nuh_layer_id" of the headers of the NAL units are "6" before switching and after switching, and in "nuh_layer_id", the type of the encoded component included in the encoded image data of the extended video stream is not indicated. In this case, "scalable_index" is "0x10", indicating the SDR and HFR encoded component, corresponding to after switching, and "scalable_index" is "0x18", indicating the HDR and HFR encoded component, corresponding to before switching.

Figure 16:
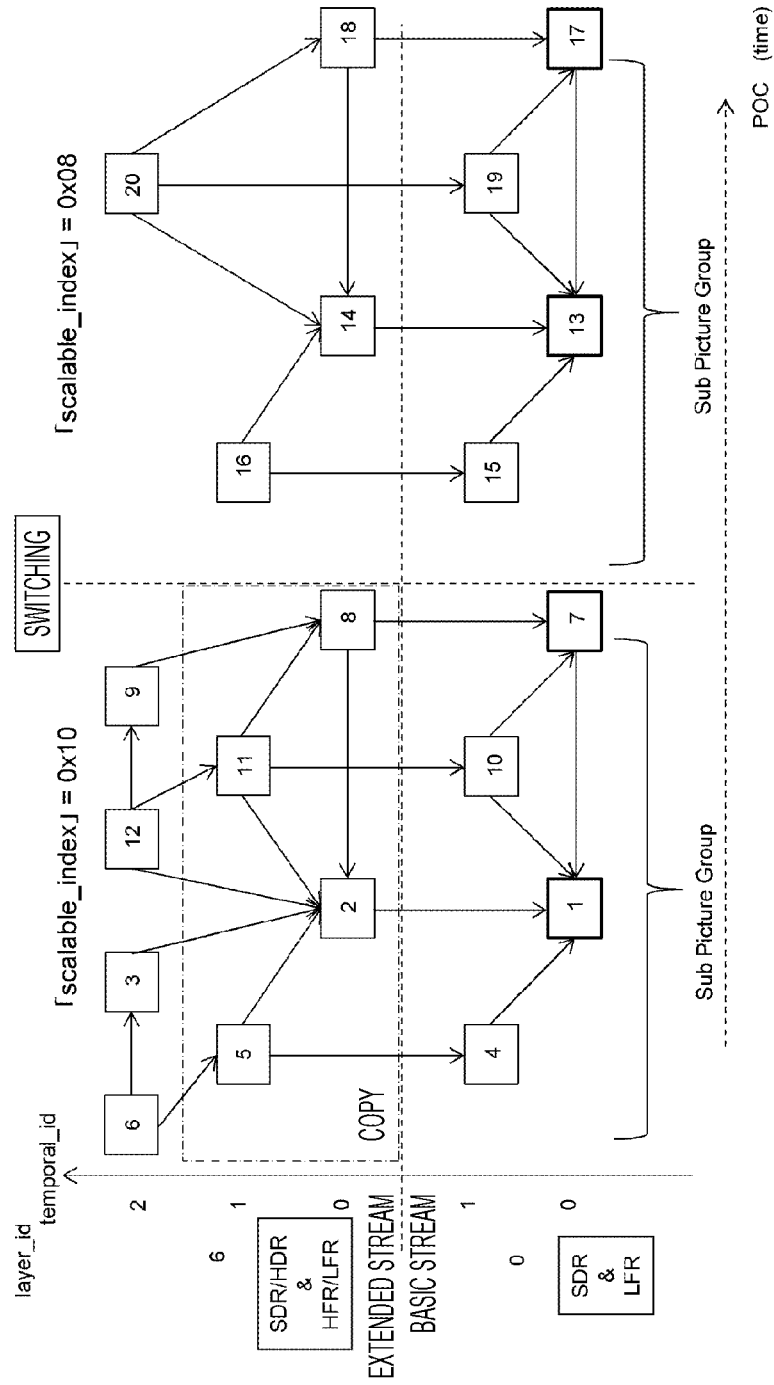
FIG. 16 is a diagram illustrating configuration examples ("SDR+HFR"→"HDR+LFR") of encoded image data of a basic video stream BS and encoded image data of an extended video stream ES.

FIG. 16 also illustrates configuration examples of the encoded image data of the basic video stream BS obtained in the encoding unit 106b, and the encoded image data of the extended video stream ES obtained in the encoding unit 106e.

In this example, the SDR and LFR encoded component is included in the encoded image data of the basic video stream BS, the SDR and HFR encoded component is included in the encoded image data of the extended video stream ES before switching, and the HDR and LFR encoded component is included after switching.

In this example, the value of "nuh_layer_id" is flexibly allocated, and "nuh_layer_id" does not configure the high-quality format information. That is, this example is an example in which "scalable_index" of the scalable linkage SEI message configures the high-quality format information.

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in three hierarchies of 0, 1, and 2 in the sub group of pictures before switching, and 0, 1, and 2 are respectively set as temporal_ids (hierarchical identification information) arranged in the headers of the NAL units (nal_units) that configure the encoded image data of pictures of hierarchies 0, 1, and 2. Here, the pictures "2", "5", "8", and "11" are respectively copies of the pictures "1", "4", "7", and "10", the picture "3" refers to the picture "2", and the picture "6" refers to the picture "5".

The hierarchical encoding is performed in three hierarchies of 0, 1, and 2 in the sub group of pictures after switching, and 0, 1, and 2 are set as temporal_ids (hierarchical identification information) to be arranged in the headers of NAL units (nal_units) that configure the encoded image data of pictures of hierarchies 0 and 1, 2. Here, the pictures "14", "16", "18", and "20" are respectively pictures of HDR difference of the pictures "13", "15", "17", and "19".

Values of "nuh_layer_id" of the headers of the NAL units are "6" before switching and after switching, and in "nuh_layer_id", the type of the encoded component included in the encoded image data of the extended video stream is not indicated. In this case, "scalable_index" is "0x10", indicating the SDR and HFR encoded component, corresponding to before switching, and "scalable_index" is "0x08", indicating the HDR and LFR encoded component, corresponding to after switching.

FIG. 17 also illustrates configuration examples of the encoded image data of the basic video stream BS obtained in the encoding unit 106b, and the encoded image data of the extended video stream ES obtained in the encoding unit 106e. In this example, the SDR and LFR encoded component is included in the encoded image data of the basic video stream BS, the HDR and HFR encoded component is included in the encoded image data of the extended video stream ES before switching, and HDR and LFR encoded component is included after switching.

In this example, the value of "nuh_layer_id" is flexibly allocated, and "nuh_layer_id" does not configure the high-quality format information. That is, this example is an example in which "scalable_index" of the scalable linkage SEI message configures the high-quality format information.

The encoded image data of the basic video stream is hierarchically encoded in two hierarchies of 0 and 1. 0 and 1 are respectively set as temporal_ids (hierarchical identification information) arranged in the headers of the NAL units (nal_units) that configure the encoded image data of pictures of hierarchies 0 and 1. Further, values of "nuh_layer_id" of the headers of the NAL units are "0".

Further, the encoded image data of the extended video stream is hierarchically encoded in three hierarchies of 0, 1, and 2 in the sub group of pictures before switching, and 0, 1, and 2 are respectively set as temporal_ids (hierarchical identification information) arranged in the headers of the NAL units (nal_units) that configure the encoded image data of pictures of hierarchies 0, 1, and 2. Here, the pictures "2", "5", "8", and "11" are respectively pictures of HDR difference of the pictures "1", "4", "7", and "10".

The hierarchical encoding is performed in three hierarchies of 0, 1, and 2 in the sub group of pictures after switching, and 0, 1, and 2 are set as temporal_ids (hierarchical identification information) to be arranged in the headers of NAL units (nal_units) that configure the encoded image data of pictures of hierarchies 0 and 1, 2. Here, the pictures "14", "16", "18", and "20" are respectively pictures of HDR difference of the pictures "13", "15", "17", and "19".

Values of "nuh_layer_id" of the headers of the NAL units are "6" before switching and after switching, and in "nuh_layer_id", the type of the encoded component included in the encoded image data of the extended video stream is not indicated. In this case, "scalable_index" is "0x18", in indicating the HDR and HFR encoded component, corresponding to before switching, and "scalable_index" is "0x08", indicating that the HDR and LFR encoded component, corresponding to after switching.

Referring back to FIG. 2, the system encoder 107 PES packetizes and TS packetizes the basic video stream BS and the extended video stream ES generated in the video encoder 106 to generate the transport stream TS. Then, the transmitting unit 108 transmits the transport stream TS on a broadcast wave packet or a network packet to the receiving device 200.

The system encoder 107 inserts the high-quality format information to the transport stream TS as a container. In this embodiment, newly defined scalable linkage descriptor (Scalable linkage descriptor) is inserted into the video elementary stream loop corresponding to the extended video stream existing under arrangement of the program map table (PMT).

FIG. 18A indicates a structure example (syntax) of the scalable linkage descriptor. FIG. 18B indicates content (semantics) of principal information in the structure example. An 8-bit field of "descriptor tag" indicates a descriptor type, and here indicates scalable linkage descriptor. An 8-bit field of "descriptor length" indicates the length (size) of the descriptor, and indicates a subsequent number of bytes as the length of the descriptor.

A 16-bit field of "scalable_index" is an index indicating a type of a scalable extended stream. This field of "scalable_index" is set to the same value as the field of "scalable_index" of the scalable linkage SEI message (see FIG. 9). Therefore, in a case where the value of "nuh_layer_id" of the header of the NAL unit is flexibly allocated, and the field of "scalable_index" of the scalable linkage SEI message configures the high-quality format information, this field of "scalable_index" of the scalable linkage descriptor configures similar information.

A 6-bit field of "nuh_layer_id" indicates a layer ID included in the extended video stream. This field of "nuh_layer_id" is set to the same value as the field of "nuh_layer_id" of the header of the NAL unit. Therefore, in a case where the value of "nuh_layer_id" of the header of the NAL unit is fixed by the type of the encoded component included in the encoded image data of the extended video stream, and the field of "nuh_layer_id" configures the high-quality format information, this field of "nuh_layer_id" of the scalable linkage descriptor configures similar information.

FIG. 19A illustrates an example of values of fields in a case where the value of "nuh_layer_id" of the header of the NAL unit is fixed by the encoded component. In this case, the field of "nuh_layer_id" of the header of the NAL unit configures the high-quality format information. In this case, the field of "nuh_layer_id" of the scalable linkage descriptor also configures the high-quality format information. In this case, the value of "scalable_index" of the scalable linkage descriptor does not indicate the high-quality format corresponding to the encoded image data of the extended video stream.

FIG. 19B illustrates an example of values of fields in a case where the value of "nuh_layer_id" of the header of the NAL unit is flexibly allocated. In this case, the field of "nuh_layer_id" of the header of the NAL unit does not configure the high-quality format information. In this case, the field of "scalable_index" of the scalable linkage SEI message configures the high-quality format information. In this case, the field of "scalable_index" of the scalable linkage descriptor also configures the high-quality format information. Note that it can be considered to include prediction conversion information (dynamic range conversion information) to the scalable linkage descriptor, similarly to the scalable linkage SEI message (see FIG. 9) although not illustrated.

Configuration of Transport Stream TS

Figure 20:
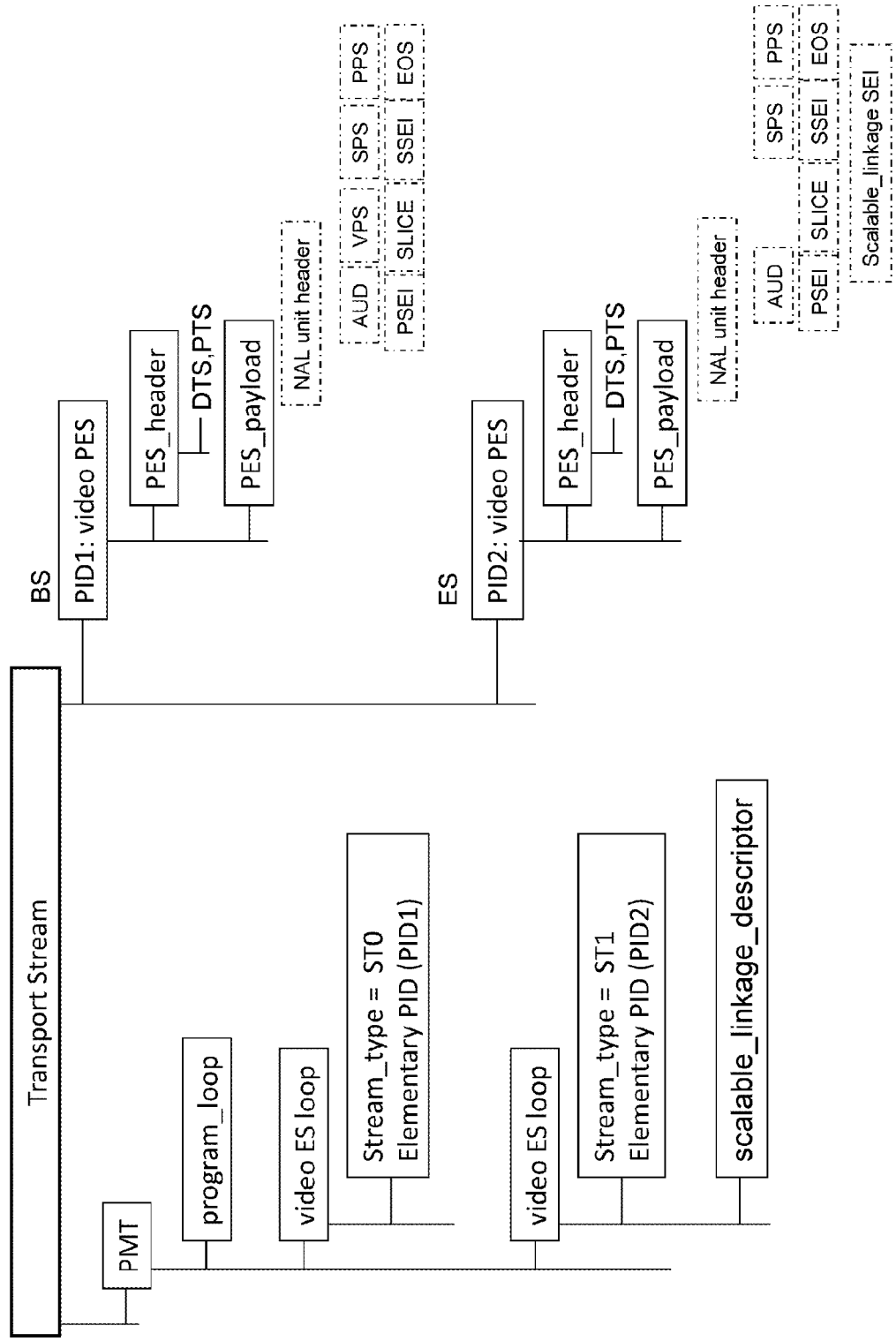
FIG. 20 is a diagram illustrating a configuration example of a transport stream TS.

FIG. 20 illustrates a configuration example of the transport stream TS. The transport stream TS includes the basic video stream BS and the extended video stream ES. In this configuration example, PES packets "video PES" of the video streams exist.

Packet identification (PID) of the basic video stream BS is, for example, PID1. This basic video stream BS includes the encoded image data of the pictures of the basic format image data. In this encoded image data, the NAL units such as AUD, VPS, SPS, PPS, PSEI, SLICE, SSEI, and EOS exist.

Further, packet identification (PID) of the extended video stream ES is, for example, PID2. This extended video stream ES includes the encoded image data of the pictures of the high-quality format image data. In this encoded image data, the NAL units such as AUD, SPS, PPS, PSEI, SLICE, SSEI, and EOS exist.

For example, when the value of "nuh_layer_id" of the header of the NAL unit is fixed by the encoded component, the field of "nuh_layer_id" configures the high-quality format information. Meanwhile, in a case where the value of "nuh_layer_id" of the header of the NAL unit is flexibly allocated, the scalable linkage SEI message (see FIG. 9) including the field of "scalable_index" that configures the high-quality format information is inserted into the portion of "SEIs" of the access unit (AU).

Further, the program map table (PMT) is included in the transport stream TS as program specific information (PSI). This PSI is information that describes which program the elementary systems included in the transport stream belong to.

In the PMT, a program loop that describes information regarding the entire program exists. Further, in the PMT, an elementary stream loop having information regarding the elementary streams exists.

In this configuration example, video elementary stream loops (video ES loops) respectively corresponding to the basic video stream BS and the extended video stream ES exist. In the video elementary stream loop corresponding to the basic video stream BS, information such as a stream type (ST0) and the packet identification (PID1) is arranged, and descriptor that describes information regarding the extended video stream ES is also arranged.

Further, in the video elementary stream loop corresponding to the extended video stream ES, information such as a stream type (ST1) and the packet identification (PID2) is arranged, and descriptor that describes information regarding the extended video stream ES is also arranged. As one of the descriptor, the scalable linkage descriptor (see FIGS. 18A and 18B) is arranged.

An operation of the transmitting device 100 illustrated in FIG. 2 will be briefly described. The basic format image data Vb that is the SDR image data having the frame frequency of 50 Hz is supplied to the photoelectric conversion unit 102. In this photoelectric conversion unit 102, the SDR photoelectric conversion characteristic (SDR OETF curve) is applied to the basic format image data Vb, and the basic format image data Vb' for transmission is obtained. This basic format image data Vb' is converted from the RGB domain into the luminance and chrominance (YCbCr) domain by the RGB/YCbCr conversion unit 103, and is then supplied to the encoding units 106b and 106e of the video encoder 106.

Further, the high-quality format image data Ve is supplied to the photoelectric conversion unit 104. The high-quality format image data Ve is, for example, any of (a) the HDR image data having the frame frequency of 100 Hz, (b) the HDR image data having the frame frequency of 50 Hz, and (c) the SDR image data having the frame frequency of 100 Hz.

In the photoelectric conversion unit 104, the HDR photoelectric conversion characteristic (HDR OETF curve) or the SDR photoelectric conversion characteristic (SDR OETF curve) is applied to the high-quality format image data Ve, and the high-quality format image data Ve' for transmission is obtained. This high-quality format image data Ve' is converted from the RGB domain into the luminance and chrominance (YCbCr) domain by the RGB/YCbCr conversion unit 105, and is then supplied from the encoding unit 106e of the video encoder 106.

In the encoding unit 106b, the prediction encoding processing such as H.264/AVC or H.265/HEVC is applied to the basic format image data Vb' for transmission and the encoded image data is obtained, and the basic video stream (video elementary stream) BS including the encoded video data is generated. This basic video stream BS is supplied to the system encoder 107.

In the encoding unit 106e, the prediction encoding processing such as H.264/AVC or H.265/HEVC is applied to the high-quality format image data Ve' for transmission and the encoded image data is obtained, and the extended video stream (video elementary stream) ES including the encoded video data is generated. In this case, in the encoding unit 106e, prediction of an inside of the image data Ve' and prediction between the image data Ve' and the image data Vb' is selectively performed for each encoded block in order to make the prediction residual small.

In the encoding unit 106e, the high-quality format information is inserted into the extended video stream ES. For example, this information is inserted into the header of the NAL unit. In this case, the value of "nuh_layer_id" (see FIGS. 6A and 6B) is fixed by the type of the encoded component included in the encoded image data. Further, for example, this information is inserted into the area of the SEI NAL unit. In this case, the newly defined scalable linkage SEI message (see FIG. 9) is inserted into the portion of "SEIs" of the access unit (AU).

In the system encoder 107, the basic video stream BS and the extended video stream ES generated in the video encoder 106 are PES packetized and TS packetized, and the transport stream TS is generated. At this time, in the system encoder 107, the high-quality format information is inserted into the transport stream TS as a container. That is, the newly defined scalable linkage descriptor (see FIGS. 18A and 18B) is arranged in the video elementary stream loop corresponding to the extended video stream existing under arrangement of the PMT.

The transport stream TS generated in the system encoder 107 is sent to the transmitting unit 108. In the transmitting unit 108, the transport stream TS on a broadcast wave packet or a network packet is transmitted to the receiving device 200.

Configuration of Receiving Device

Figure 21:
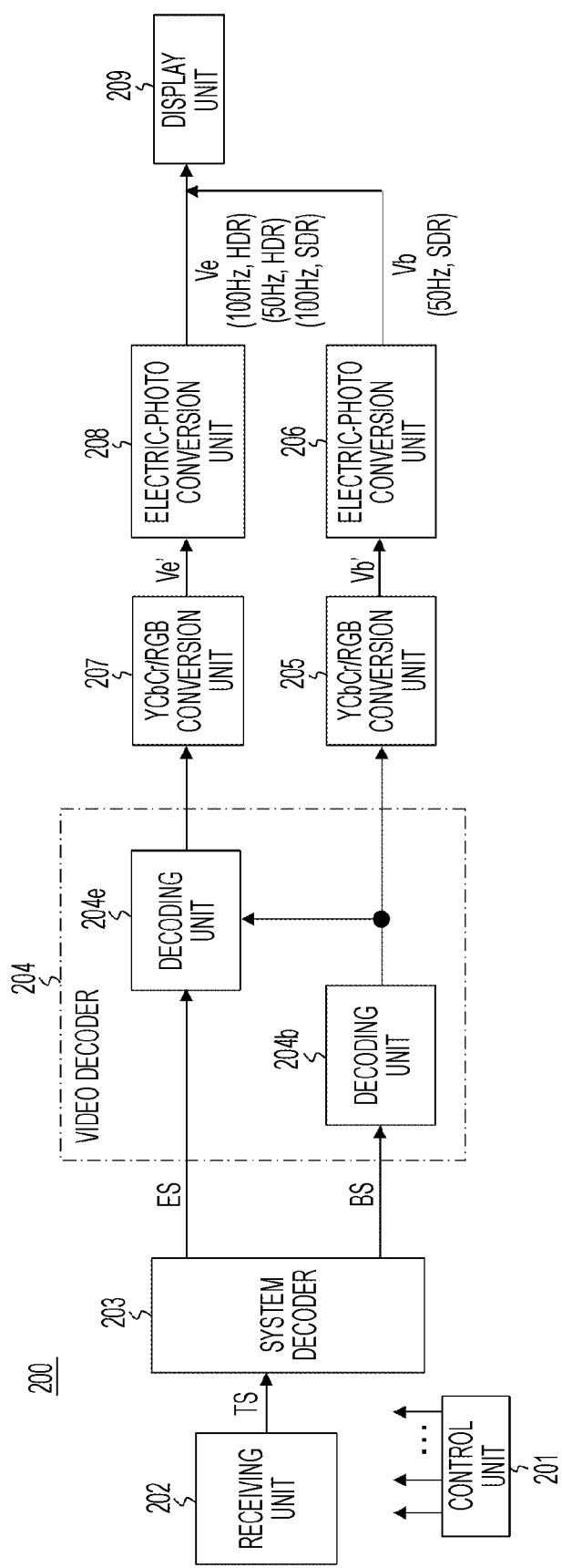
FIG. 21 is a block diagram illustrating a configuration example of a receiving device.

FIG. 21 illustrates a configuration example of the receiving device 200. The receiving device 200 corresponds to the configuration example of the transmitting device 100 of FIG. 2. This receiving device 200 includes a control unit 201, a receiving unit 202, a system encoder 203, a video encoder 204, a YCbCr/RGB conversion unit 105, an electric-photo conversion unit 206, a YCbCr/RGB conversion unit 207, an electric-photo conversion unit 208, and a display unit 209.

The control unit 201 includes a central processing unit (CPU), and controls operations of the respective units of the receiving device 200 on the basis of a control program. The receiving unit 202 receives the transport stream TS on a broadcast wave packet or a network packet sent from the transmitting device 100. The system encoder 203 extracts the basic video stream BS and the extended video stream ES from the transport stream TS.

Further, the system encoder 203 extracts various types of information inserted in the transport stream TS as a container and sends the information to the control unit 201. This information includes the above-described scalable linkage descriptor (see FIGS. 18A and 18B). The control unit 201 recognizes the type of the encoded component included in the encoded image data of the extended video stream ES on the basis of the field of "nuh_layer_id" of the descriptor or the field of "scalable_index". That is, the control unit 201 recognizes whether the HDR and HFR encoded component is included, whether the HDR and LFR encoded component is included, or whether the SDR and HFR encoded component is included, and selects an object to be decoded according to the configuration of the receiving and display system.

The video encoder 204 includes a decoding unit 204b and a decoding unit 204e. The decoding unit 204b applies the decoding processing to the basic video stream BS to obtain the basic format image data Vb'. In this case, the decoding unit 204b performs prediction compensation inside the image data Vb'.

The decoding unit 204e applies the decoding processing to the extended video stream ES to generate the high-quality format image data Ve'. In this case, the decoding unit 204e performs prediction compensation of an inside of the image data Ve' or prediction compensation between the image data Ve' and the image data Vb', for each encoded block, corresponding to the prediction in the encoding.

Figure 22:
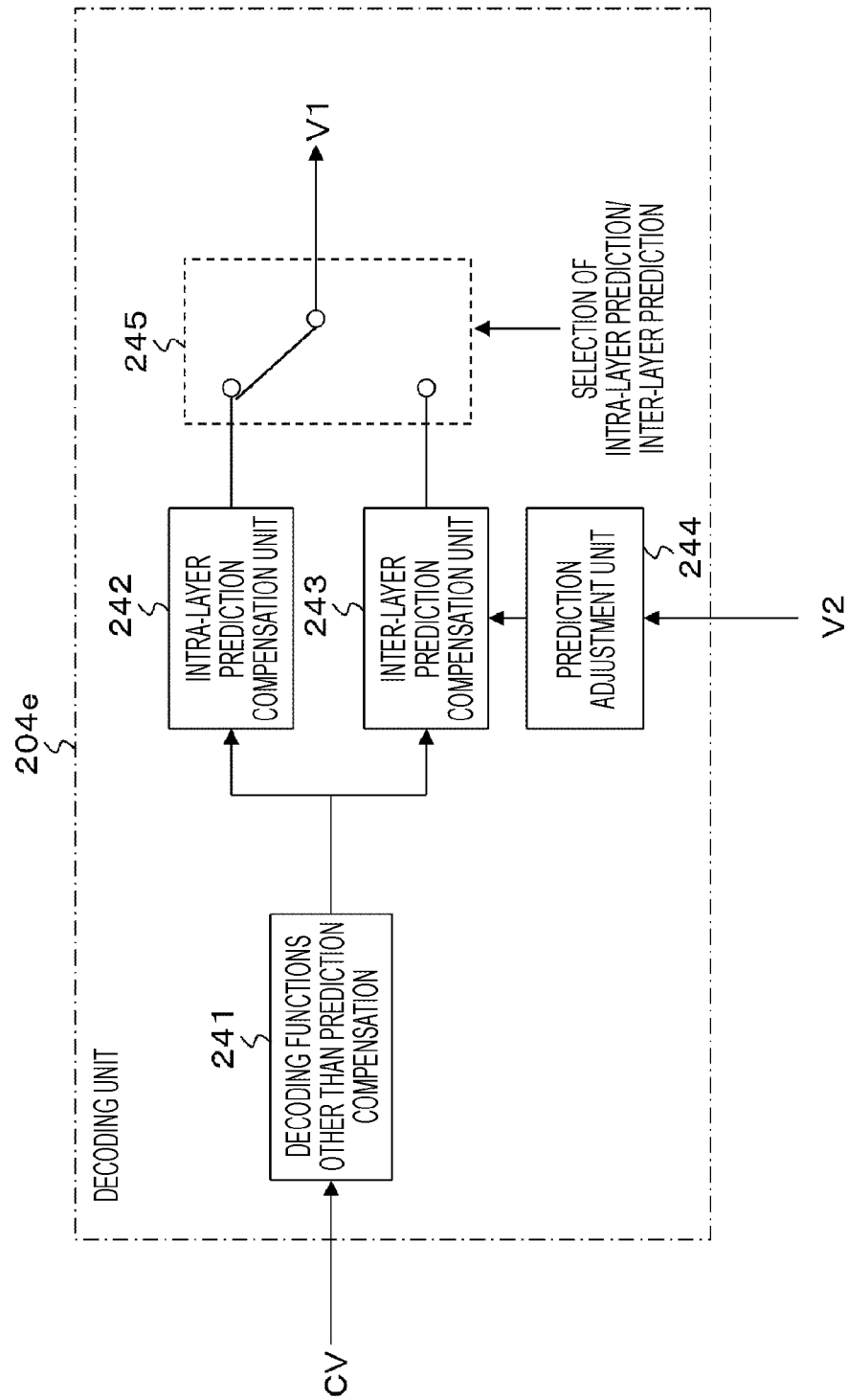
FIG. 22 is a block diagram illustrating a configuration example of principal portions of a decoding unit.

FIG. 22 illustrates a configuration example of principal portions of the decoding unit 204e. This decoding unit 204e performs reverse processing of the processing of the encoding unit 106e of the FIG. 4. This decoding unit 204e includes a decoding function unit 241, an intra-layer prediction compensation unit 242, an inter-layer prediction compensation unit 243, a prediction adjustment unit 244, and a selection unit 245.

The decoding function unit 241 performs the decoding processing other than the prediction compensation to the encoded image data CV to obtain the prediction residual data. The intra-layer prediction compensation unit 242 performs, for the prediction residual data, prediction compensation (intra-layer prediction compensation) inside the image data V1 to obtain the image data V1. The inter-layer prediction compensation unit 243 performs, for the prediction residual data, prediction compensation (inter-layer prediction compensation) between the image data V1 and the image data V2 to be referred to obtain the image data V1.

The prediction adjustment unit 244 performs processing according to the type of the scalable extension of the image data V1 relative to the image data V2, similarly to the prediction adjustment unit 163 of the encoding unit 106e of the FIG. 4, although detailed description is omitted. The selection unit 245 selectively takes out the image data V1 obtained in the intra-layer prediction compensation unit 242 or the image data V1 obtained in the inter-layer prediction compensation unit 243, for each encoded block, corresponding to the prediction in the encoding, and outputs the image data V1.

Referring to FIG. 21, the decoding unit 204e extracts parameter sets, SEI messages, and the like inserted in the access units that configure the extended video stream ES, and sends the extracted information to the control unit 201. The control unit 201 recognizes the high-quality format corresponding to the encoded image data of the extended video stream ES from the field of "nuh_layer_id" of the header of the NAL unit or the field of "scalable_index" of the scalable linkage SEI message.

As described above, the control unit 201 also recognizes the type of the encoded component included in the encoded image data of the extended video stream ES by the field of "nuh_layer_id" of the scalable linkage descriptor or the field of "scalable_index". However, identification information of a container level such as the descriptor cannot follow dynamic change in units of video frames. Recognition of the type of the encoded component included in the encoded image data of the extended video stream ES from the field of "nuh_layer_id" of the header of the NAL unit or the field of "scalable_index" of the scalable linkage SEI message enables following of the dynamic change in units of frames.

Further, the control unit 201 recognizes the conversion table information for prediction adjustment from the field of "scalable_index" of the scalable linkage SEI message. The control unit 201 sets the conversion table to the prediction adjustment unit 244. With the setting, the prediction adjustment unit 244 can reliably perform level adjustment (dynamic range conversion) similar to the prediction adjustment unit 163 of the transmission side.

The YCbCr/RGB conversion unit 105 converts the basic format image data Vb' obtained in the decoding unit 204b from the luminance and chrominance (YCbCr) domain into the RGB domain. The electric-photo conversion unit 206 applies electric-photo conversion having a reverse characteristic to the photoelectric conversion unit 102 in the transmitting device 100, to the basic format image data Vb' converted into the RGB domain, to obtain the basic format image data Vb. This basic format image data is the SDR image data having the frame frequency of 50 Hz.

The YCbCr/RGB conversion unit 207 converts the high-quality format image data Ve' obtained in the decoding unit 204e from the luminance and chrominance (YCbCr) domain into the RGB domain. The electric-photo conversion unit 208 applies the electric-photo conversion having a reverse characteristic to the photoelectric conversion unit 104 in the transmitting device 100, to the high-quality format image data Ve' converted into the RGB domain, to obtain the high-quality format image data Ve.

This high-quality format image data is any of (a) the HDR image data having the frame frequency of 100 Hz (high frame rate: HFR), (b) the HDR image data having the frame frequency of 50 Hz (LFR), and (c) the SDR image data having the frame frequency of 100 Hz (HFR).

The display unit 209 is configured from, for example, liquid crystal display (LCD), an organic electro-luminescence (EL) panel, and the like. display unit 209 displays an image by either the basic format image data Vb or the high-quality format image data Ve according to the display capability.

In this case, the control unit 201 controls the image data to be supplied to the display unit 209, that is, the image data obtained as the display image data. This control is performed on the basis of the high-quality format information corresponding to the encoded image data of the extended video stream ES and thus the high-quality format information of the high-quality format image data Ve, and the display capability information of the display unit 209.

That is, in a case where the display unit 209 cannot display an image by the high-quality format image data Ve, the control unit 201 performs control such that the basic format image data Vb is supplied to the display unit 209. On the other hand, in a case where the display unit 209 can display an image by the high-quality format image data Ve, the control unit 201 performs control such that the high-quality format image data Ve is supplied to the display unit 209.

An operation of the receiving device 200 illustrated in FIG. 21 will be briefly described. In the receiving unit 202, the transport stream TS on a broadcast wave packet or a network packet sent from the transmitting device 100 is received. This transport stream TS is supplied to the system encoder 203. In the system encoder 203, the basic video stream BS and the extended video stream ES are extracted from the transport stream TS. The basic video stream BS is supplied to the decoding unit 204b. The extended video stream ES is supplied to the decoding unit 204e.

Further, in the system encoder 203, the various types of information inserted in the transport stream TS as a container are extracted and are sent to the control unit 201. This information also includes the scalable linkage descriptor (see FIGS. 18A and 18B). In the control unit 201, the high-quality format corresponding to the encoded image data of the extended video stream ES is recognized on the basis of the field of "nuh_layer_id" of the descriptor of the field of "scalable_index".

In the decoding unit 204b, the decoding processing is applied to the basic video stream BS, and the basic format image data Vb' is generated. In this case, in the decoding unit 204b, the prediction compensation is performed inside the image data Vb'. In the decoding unit 204e, the decoding processing is applied to the extended video stream ES, and the high-quality format image data Ve' is generated. In this case, in the decoding unit 204e, the prediction compensation inside the image data Ve' or the prediction compensation between the image data Ve' and the image data Vb' is performed for each encoded block, corresponding to the prediction in the encoding.

Further, in the decoding unit 204e, the parameter sets, SEI messages, and the like inserted in the access units that configure the extended video stream ES are extracted and are sent to the control unit 201. In the control unit 201, the high-quality format corresponding to the encoded image data of the extended video stream ES is recognized in units of frames from the field of "nuh_layer_id" of the header of the NAL unit or the field of "scalable_index" of the scalable linkage SEI message.

The basic format image data Vb' obtained in the decoding unit 204b is converted from the luminance and chrominance (YCbCr) domain into the RGB domain in the YCbCr/RGB conversion unit 205, and is supplied to the electric-photo conversion unit 206. In the electric-photo conversion unit 206, the electric-photo conversion having a reverse characteristic to the photoelectric conversion in the transmitting device 100 is applied to the basic format image data Vb' converted into the RGB domain, and the basic format image data Vb is obtained.

The high-quality format image data Ve' obtained in the decoding unit 204e is converted from the luminance and chrominance (YCbCr) domain into the RGB domain in the YCbCr/RGB conversion unit 207, and is supplied to the electric-photo conversion unit 208. In the electric-photo conversion unit 208, the electric-photo conversion having a reverse characteristic to the photoelectric conversion in the transmitting device 100 is applied to the high-quality format image data Ve' converted into the RGB domain, and the high-quality format image data Ve is obtained.

The image data (display image data) to be supplied to the display unit 209 is controlled by the control unit 201. This control is performed on the basis of the high-quality format information corresponding to the encoded image data of the extended video stream ES and thus the high-quality format information of the high-quality format image data Ve, and the display capability information of the display unit 209.

In a case where the display unit 209 cannot display an image by the high-quality format image data Ve, the control unit 201 performs control such that the basic format image data Vb is supplied to the display unit 209. With this control, the basic format (50 H and normal dynamic range) image is displayed on the display unit 209. On the other hand, in a case where the display unit 209 can display an image by the high-quality format image data Ve, the high-quality format image data Ve is supplied to the display unit 209. With this control, the high-quality format image is displayed on the display unit 209.

As described above, in the transmitting and receiving system 10 illustrated in FIG. 1, the information (high-quality format information) indicating the high-quality format corresponding to the encoded image data of the extended video stream is inserted into the extended video stream and/or the container. Therefore, the receiving side can easily recognize the high-quality format of the high-quality format image data. Then, the receiving side can select the basic format image data Vb or the high-quality format image data Ve as the display image data on the basis of the information and the display capability information, and can easily display an image according to the display capability.

2. Modification

Note that, in the above-described embodiment, the transmitting and receiving system 10 including the transmitting device 100 and the receiving device 200 has been described. However, a configuration of a transmitting and receiving system to which the present technology can be applied is not limited to the embodiment. For example, the portion of the receiving device 200 may have a configuration of a set top box and a monitor connected with a digital interface such as high-definition multimedia interface (HDMI). In this case, the set top box can acquire display capability information by acquiring extended display identification data (EDID) from the monitor, or the like. Note that "HDMI" is a registered trademark.

Further, in the above-described embodiment, the example in which the container is the transport stream (MPEG-2 TS) has been described. However, the present technology can be similarly applied to a system having a configuration in which data is distributed to a receiving terminal, using a network such as the Internet. In the distribution through the Internet, data is often distributed with a container of MP4 or another format. That is, containers of various formats such as a transport stream (MPEG-2 TS) employed in a digital broadcasting standard, an MPEG media transport (MMT) as a next-generation transport, and MP4 used in Internet distribution fall under the container.

Further, the present technology can have the configurations below.

(1) A transmitting device including:
an image encoding unit configured to generate two video streams including a basic video stream including encoded image data of basic format image data, and an extended video stream including encoded image data of high-quality format image data of one type selected from among a plurality of types;
a transmitting unit configured to transmit a container of a predetermined format including the basic video stream and the extended video stream; and
an information insertion unit configured to insert information indicating a high-quality format corresponding to the encoded image data included in the video stream into the extended video stream and/or the container.

(2) The transmitting device according to (1), in which the image encoding unit
performs, regarding the basic format image data, prediction encoding processing of an inside of the basic format image data, to obtain encoded image data, and
selectively performs, regarding the high-quality format image data, prediction encoding processing of an inside of the high-quality format image data and prediction encoding processing of between the high-quality format image data and the basic format image data, to obtain encoded image data.

(3) The transmitting device according to (2), in which
the basic format image data is normal dynamic range and low frame rate image data,
the high-quality format image data is any of high dynamic range and high frame rate image data, high dynamic range and low frame rate image data, and normal dynamic range and high frame rate image data, and
the encoded image data of the high-quality format image data includes an encoded component of high dynamic range image data by difference information relative to normal dynamic range image data and/or an encoded component of high frame rate image data by difference information relative to low frame rate image data.

(4) The transmitting device according to (3), in which the image encoding unit performs dynamic range conversion for the normal dynamic range image data to make a difference value small when obtaining the difference information relative to the normal dynamic range image data.

(5) The transmitting device according to (4), in which the image encoding unit performs the dynamic range conversion for the normal dynamic range image data on the basis of conversion information for converting a value of conversion data by a normal dynamic range photoelectric conversion characteristic into a value of conversion data by a high dynamic range photoelectric conversion characteristic.

(6) The transmitting device according to (5), in which the information insertion unit further inserts the conversion information into the extended video stream and/or the container.

(7) The transmitting device according to any of (1) to (6), in which
the image encoding unit
causes a time indicated by a decoding timestamp to be added to encoded image data of each of pictures included in the extended video stream to be the same as or an intermediate time between times indicated by decoding timestamps to be added to encoded image data of pictures included in the basic video stream, equalizes an interval between the times indicated by decoding timestamps to be added to encoded image data of pictures included in the basic video stream, and
equalizes an interval between the times indicated by decoding timestamps to be added to encoded image data of pictures included in the extended video stream.

(8) The transmitting device according to any of (1) to (7), in which
the extended video stream has a NAL unit structure, and
the information insertion unit inserts the information indicating a high-quality format corresponding to the encoded image data included in the extended video stream into a header of the NAL unit.

(9) The transmitting device according to any of (1) to (7), in which
the extended video stream has a NAL unit structure, and
the information insertion unit inserts the information indicating a high-quality format corresponding to the encoded image data included in the extended video stream into an area of a SEI NAL unit.

(10) The transmitting device according to any of (1) to (9), in which
the container is an MPEG2-TS, and
the information insertion unit inserts the information indicating a high-quality format corresponding to the encoded image data included in the extended video stream into a video elementary stream loop corresponding to the extended video stream existing under arrangement of a program map table.

(11) A transmitting method including:
an image encoding step of generating two video stream including a basic video stream including encoded image data of basic format image data, and an extended video stream including encoded image data of high-quality format image data of one type selected from a plurality of types;
a transmitting step of transmitting, by a transmitting unit, a container of a predetermined format including the basic video stream and the extended video stream; and
an information inserting step of inserting information indicating a high-quality format corresponding to the encoded image data of the high-quality format image data into the extended video stream and/or the container.

(12) A receiving device including:
a receiving unit configured to receive a container of a predetermined format including two video stream including a basic video stream including encoded image data of basic format image data, and an extended video stream including encoded image data of high-quality format image data of one type selected from a plurality of types,
information indicating a high-quality format corresponding to the encoded image data of the high-quality format image data being inserted into the extended video stream and/or the container,
the receiving device further including:
an information extraction unit configured to extract the information from the extended video stream and/or the container; and
a processing unit configured to obtain image data corresponding to a display capability from the basic video stream and the extended video stream, as display image data, on the basis of the extracted information and display capability information.

(13) The receiving device according to (12), in which
the encoded image data included in the basic video stream has been generated by performing, for the basic format image data, prediction encoding processing of an inside of the basic format image data, and
the encoded image data included in the extended video stream has been generated by selectively performing, for the high-quality format image data, prediction encoding processing of an inside of the high-quality format image data and prediction encoding processing of between the high-quality format image data and the basic format image data.

(14) A receiving method including:
a receiving step of receiving, by a receiving unit, a container of a predetermined format including two video streams including a basic video stream including encoded image data of basic format image data, and an extended video stream including encoded image data of high-quality format image data of one type selected from among a plurality of types,
information indicating a high-quality format corresponding to the encoded image data included in the high-quality format image data being inserted into the extended video stream and/or the container, and
the receiving method further including:
an information extraction step of extracting the information from the extended video stream and/or the container; and
a processing step of obtaining image data corresponding to a display capability from the basic video stream and the extended video stream, as display image data, on the basis of the extracted information and display capability information.

A main characteristic of the present technology is to enable a receiving side to easily recognize a high-quality format corresponding to encoded image data included in an extended video stream by inserting information indicating a high-quality format corresponding to the encoded image data included in the extended video stream into the extended video stream and/or a container (see FIG. 20).

10 Transmitting and receiving system
100 Transmitting device
101 Control unit
102 and 104 Photoelectric conversion unit
103 and 105 RGB/YCbCR conversion unit
106 Video encoder
106b and 106e Encoding unit
107 System encoder
108 Transmitting unit
150 Image data generation unit
151 Camera
152 Conversion unit
161 Intra-layer prediction unit
162 Inter-layer prediction unit
163 Prediction adjustment unit
164 Selection unit
165 Encoding function unit
200 Receiving device
201 Control unit
202 Receiving unit
203 System encoder
204 Video encoder
204b and 204e Decoding unit
205 and 207 YCbCr/RGB conversion unit
206 and 208 Electric-photo conversion unit
209 Display unit
241 Decoding function unit
242 Intra-layer prediction compensation unit 243 Inter-layer prediction compensation unit
244 Prediction adjustment unit
245 Selection unit

The invention claimed is:

1. A transmitting device, comprising:
circuitry configured to:
generate a basic video stream including first encoded image data of first image data of a basic format, and an extended video stream including second encoded image data of second image data of a type of high-quality format that is selected from a plurality of selectable types of high-quality format, the first image data corresponding to a first dynamic range, the second encoded image data including an encoded component of image data corresponding to a second dynamic range that is greater than the first dynamic range, wherein
the encoded component of image data corresponding to the second dynamic range corresponds to difference information between the first image data and the image data corresponding to the second dynamic range, and
the encoded component of image data corresponding to the second dynamic range is, for at least a dynamic range, extension of the first image data from the first dynamic range to the second dynamic range, and
generate a container that includes the basic video stream, the extended video stream, and scalable information, the scalable information including a first field that specifies the type of high-quality format corresponding to the second encoded image data; and
a transmitter configured to transmit the container.

2. The transmitting device according to claim 1, wherein the scalable information includes a second field that indicates a length of the scalable information.

3. The transmitting device according to claim 1, wherein the transmitter is configured to transmit the container through a broadcast path.

4. The transmitting device according to claim 1, wherein the transmitter is configured to transmit the container through a network path.

5. The transmitting device according to claim 1, wherein the container is in an MPEG Media Transport (MMT) format or an MP4 format.

6. The transmitting device according to claim 1, wherein the extended video stream has an NAL unit structure, and the scalable information is included in a header of an NAL unit of the extended video stream.

7. The transmitting device according to claim 1, wherein the extended video stream has an NAL unit structure, and the scalable information is included in an SEI NAL unit of the extended video stream.

8. The transmitting device according to claim 1, wherein the container is an MPEG2-TS, and
the scalable information is a descriptor included in a program map table of the MPEG2-TS.

9. A transmitting method, comprising:
generating, by circuitry of a device, a basic video stream including first encoded image data of first image data of a basic format, and an extended video stream including second encoded image data of second image data of a type of high-quality format that is selected from a plurality of selectable types of high-quality format, the first image data corresponding to a first dynamic range, the second encoded image data including an encoded component of image data corresponding to a second dynamic range that is greater than the first dynamic range, wherein
the encoded component of image data corresponding to the second dynamic range corresponds to difference information between the first image data and the image data corresponding to the second dynamic range, and
the encoded component of image data corresponding to the second dynamic range is, for at least a dynamic rang, extension of the first image data from the first dynamic range to the second dynamic range;
generating, by the circuitry of the device, a container that includes the basic video stream, the extended video stream, and scalable information, the scalable information including a first field that specifies the type of high-quality format corresponding to the second encoded image data; and
transmitting, by a transmitter of the device, the container.

10. A receiving device, comprising:
a receiver configured to receive a container that includes a basic video stream, an extended video stream, and scalable information,
the basic video stream including first encoded image data of first image data of a basic format,
the extended video stream including second encoded image data of second image data of a type of high-quality format that is selected from a plurality of selectable types of high-quality format, the first image data corresponding to a first dynamic range, the second encoded image data including an encoded component of image data corresponding to a second dynamic range that is greater than the first dynamic range, wherein
the encoded component of image data corresponding to the second dynamic range corresponds to difference information between the first image data and the image data corresponding to the second dynamic range, and
the encoded component of image data corresponding to the second dynamic range is, for at least a dynamic rang, extension of the first image data from the first dynamic range to the second dynamic range, and
the scalable information including a first field that specifies the type of high-quality format corresponding to the second encoded image data; and
circuitry configured to:
extract the scalable information from the container, and
obtain the first image data from the basic video stream or obtain the second image data from the extended video stream, as display image data, on a basis of the extracted scalable information.

11. The receiving device according to claim 10, further comprising a display configured to display the display image data,
wherein the circuitry is configured to obtain the first image data or the second image data on a basis of a display capability of the display.

12. The receiving device according to claim 10, wherein the scalable information includes a second field that indicates a length of the scalable information.

13. The receiving device according to claim 10, wherein the receiver is configured to receive the container through a broadcast path.

14. The receiving device according to claim 10, wherein the receiver is configured to receive the container through a network path.

15. The receiving device according to claim 10, wherein the circuitry is configured to receive capability information from a display device connected to the receiving device, the capability information indicating a display capability of the display.

16. The receiving device according to claim 10, wherein the container is in an MPEG Media Transport (MMT) format or an MP4 format.

17. The receiving device according to claim 10, wherein
the extended video stream has an NAL unit structure, and
the scalable information is included in a header of an NAL unit of the extended video stream.

18. The receiving device according to claim 10, wherein
the extended video stream has an NAL unit structure, and
the scalable information is included in an SEI NAL unit of the extended video stream.

19. The receiving device according to claim 10, wherein
the container is an MPEG2-TS, and
the scalable information is a descriptor included in a program map table of the MPEG2-TS.

20. The receiving device according to claim 10, further comprising a display configured to display the display image data,
wherein the display is a liquid crystal display (LCD) or an organic electro-luminescence (EL) display.

\* \* \* \* \*